United States Patent [19]
Doi et al.

[11] Patent Number: 5,459,829
[45] Date of Patent: Oct. 17, 1995

[54] PRESENTATION SUPPORT SYSTEM

[75] Inventors: Miwako Doi; Ikiko Nishida, both of Kawasaki; Mitsuo Saito, Yokosuka; Yoichi Sadamoto, Urayasu; Kenichi Mori, Kawasaki, all of Japan

[73] Assignee: Kabushiki Kaisha Toshiba, Kawasaki, Japan

[21] Appl. No.: 834,652

[22] Filed: Feb. 12, 1992

[30] Foreign Application Priority Data

| Feb. 13, 1991 | [JP] | Japan | 3-041318 |
| May 14, 1991 | [JP] | Japan | 3-107880 |
| May 28, 1991 | [JP] | Japan | 3-123937 |

[51] Int. Cl.⁶ .................................................. G06F 15/20
[52] U.S. Cl. .................................................. 395/152
[58] Field of Search ........................... 395/139, 147, 395/148, 118, 152, 155, 161; 345/121, 122, 117, 118

[56]  References Cited

U.S. PATENT DOCUMENTS

| 4,868,766 | 9/1989 | Oosterholt | 364/522 |
| 4,954,981 | 9/1990 | Dehner, Jr. et al. | 364/900 |
| 5,197,120 | 3/1993 | Saxton et al. | 395/139 |
| 5,214,758 | 5/1993 | Ohba et al. | 395/164 |
| 5,247,610 | 9/1993 | Oshima et al. | 395/135 |
| 5,263,167 | 11/1993 | Conner, Jr. et al. | 395/700 |

*Primary Examiner*—Phu K. Nguyen
*Attorney, Agent, or Firm*—Oblon, Spivak, McClelland, Maier, & Neustadt

[57]  ABSTRACT

On the basis of, e.g., input items, attribute values, and titles, their categories are analyzed by using a proper noun dictionary, a concept dictionary, and a numeric attribute name dictionary. On the basis of the analyzed categories, changes in attribute values are analyzed in accordance with inference rules, and a keyword for describing a background state of presentation is extracted. A background material suitable for presentation is selected from background materials such as images and sounds in accordance with the extracted keyword. The selected background material is displayed in combination with a graph which is formed in accordance with content data about an object to be presented.

22 Claims, 40 Drawing Sheets

| COUNTRY \ YEAR | 1986 | 1987 | 1988 | 1989 | ~ |
|---|---|---|---|---|---|
| JAPAN | 200 | 220 | 230 | 240 | |
| USA | 200 | 190 | 200 | 210 | ~ |
| GERMANY | 100 | 120 | 130 | 140 | |

UNIT : BILLION DOLLARS

TITLE : NATIONAL INCOME OF JAPAN, U S A, AND GERMANY IN RECENT YEARS (NATIONAL INCOME OF JAPAN, U S A, AND GERMANY IN RECENT YEARS)

```
(COMPONENT
    (ORIGIN_COORDINATE ( x, y, z ))
    (SUB_COMPONENT      null )
    (LOCAL_CONDITION    null )
    (LINK_CONDITION     null )
)

(SPHERE
    (SUPER_COMPONENT )
    (VERTICAL_RADIUS  rh )
    (HORIZONTAL_RADIUS  rw )
    (COLOR            k )
    (TEXTURE          1 )
    (POSSIBLE_LOCAL_CONDITION ( RECTANGULAR_PARALLELE-
      PIPED_APPROXIMATION, ~ ))
    (POSSIBLE_LINK_CONDITION ( ONE, LINK ))
)

(VERTICAL                      (HORIZONTAL
    (SUPER COMPONENT )             (SUPER  VERTICAL )
    (LENGTH       10 )             )
    (WIDTH        w0              (HEIGHT
    (TEXTURE      k0 )                 (SUPER  VERTICAL )
                                       )
)
```

FIG. 4

(HUMAN BEING (SUPER COMPONENT)

(STATURE    h  )

(WIDTH      w  )

(COLOR      m  )

(TEXTURE    h  )

(POSSIBLE_LOCAL_CONDITION (RECTANGULAR_PARALLEL-
EPIPED_APPROXIMATION, ~ )
  (POSSIBLE_LINK_CONDITION (ONE_LINK, TWO_LINKS, HU-
MAN_BODY_LINK, ~ )
)

(RECTANGULAR_PARALLELEPIPED (SUPER COMPONENT)

(SUB_COMPONENT (VERTICAL)(HORIZONTAL)(HEIGHT)

(POSSIBLE_LOCAL_CONDITION (RECTANGULAR_PARALLEL-
EPIPED_APPROXIMATION, ~ )
  (POSSIBLE_LINK_CONDITION (ONE_LINK)
)

F I G. 5

```
(COMPONENT_CONDITION RECTANGULAR_PARALLELEPI-
   PED
   (IF LOCAL_CONDITION = RECTANGULAR_PARALLELEPI-
      PED
      (LENGTH_OF_RECTANGULAR_PARALLELEPIPED_
         APPROXIMATION ← LENGTH_OF_VERTICAL
      (WIDTH_OF_RECTANGULAR_PARALLELEPIPED_
         APPROXIMATION ← LENGTH_OF_HORIZONTAL
      (COLOR              ← COLOR

⌠
                  ⌡
)

⌠
                  ⌡
)

(COMPONENT_CONDITION SPHERE (IF LOCAL_CONDITION = RECTANGULAR_PARALLELEPI-
      PED
      (LENGTH_OF_RECTANGULAR_PARALLELEPIPED_
         APPROXIMATION ← VERTICAL_RADIUS X2
      (WIDTH_OF_RECTANGULAR_PARALLELEPIPED_
         APPROXIMATION ← HORIZONTAL_RADIUS X2
                  ⌠
                  ⌡
)
                  ⌠
                  ⌡
)
```

FIG. 6

```
(LINK_SELECTION HUMAN_BEING
    (IF LINK_CONDITION = "SMOOTH"
        (ONE_LINK ))
    (IF LINK_CONDITION = "NORMAL"
        (TWO_LINKS ))
          ⸨
    (IF LINK_CONDITION = "DYNAMIC"
        (HUMAN_BODY_LINK ))
)
          ⸨
```

FIG. 7

```
( ONE_LINK ( LENGTH     l 1 )

( WIDTH      w 1 )

( COLOR      c 1 )

( POSSIBLE_LOCAL_CONDITION ( RECTANGULAR_PARALLEL-
     EPIPED APPROXIMATION, ~ ))
   ( COMPONENT_1 null )

( CONSTRAINT ( LENGTH = LENGTH_OF_COMPONENT 1 ) (
     WIDTH = WIDTH_OF_COMPONENT 1 ) ~,
)

( TWO_LINKS ( SUPER ONE_LINK )

( POSSIBLE_LOCAL_CONDITION (RECTANGULAR_PARALLEL-
     EPIPED_APPROXIMATION, ~ )
   ( COMPONENT_2 null )

( CONSTRAINT ( LENGTH = LENGTH_OF_COMPONENT_1 +
     LENGTH_OF_COMPONENT 2 )
         ( WIDTH = WIDTH_OF_COMPONENT_1 ) ( WIDTH =
           WIDTH_OF_COMPONENT_2 )
           ~ )
)
```

FIG. 8

```
(LOCAL_SELECTION TWO_LINKS (IF LOCAL_CONDITION = "DYNAMIC"

(COMPONENT_1  FRUSTUM_OF_PYRAMID_APPROX-
            IMATION)
        (COMPONENT_2  FRUSTUM_OF_PYRAMID_APPROX-
            IMATION))
    (IF LOCAL_CONDITION = "NORMAL"

(COMPONENT_1  RECTANGULAR_PARALLELEPIPED_
            APPROXIMATION)
        (COMPONENT_2  RECTANGULAR_PARALLELEPIPED_
            APPROXIMATION))
)
```

FIG. 9

```
(RECTANGULAR_PARALLELEPIPED_APPROXIMATION (LENGTH       l2)

(WIDTH        w2)

(COLOR        c2)

(SUBSTANCE  null)

(CONSTRAINT   )

(POSSIBLE_COMPONENT (RECTANGLE, RECTANGULAR_
        PARALLELEPIPED, HUMAN_BEING, ~ )
)
```

FIG. 10

```
(COMPONENT_SELECTION_RECTANGULAR_PARALLEL-
 EPIPED
  (IF COMPONENT_CONDITION = "SMOOTH"

(SUBSTANCE SPHERE)

(IF COMPONENT_CONDITION = "NORMAL"

(SUBSTANCE RECTANGULAR_PARALLELEPIPED

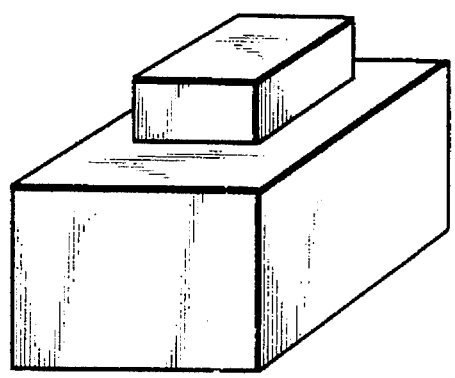
F I G. 15
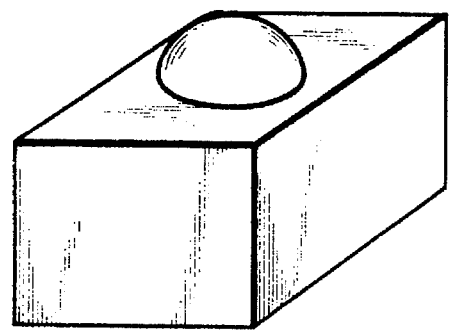
F I G. 17

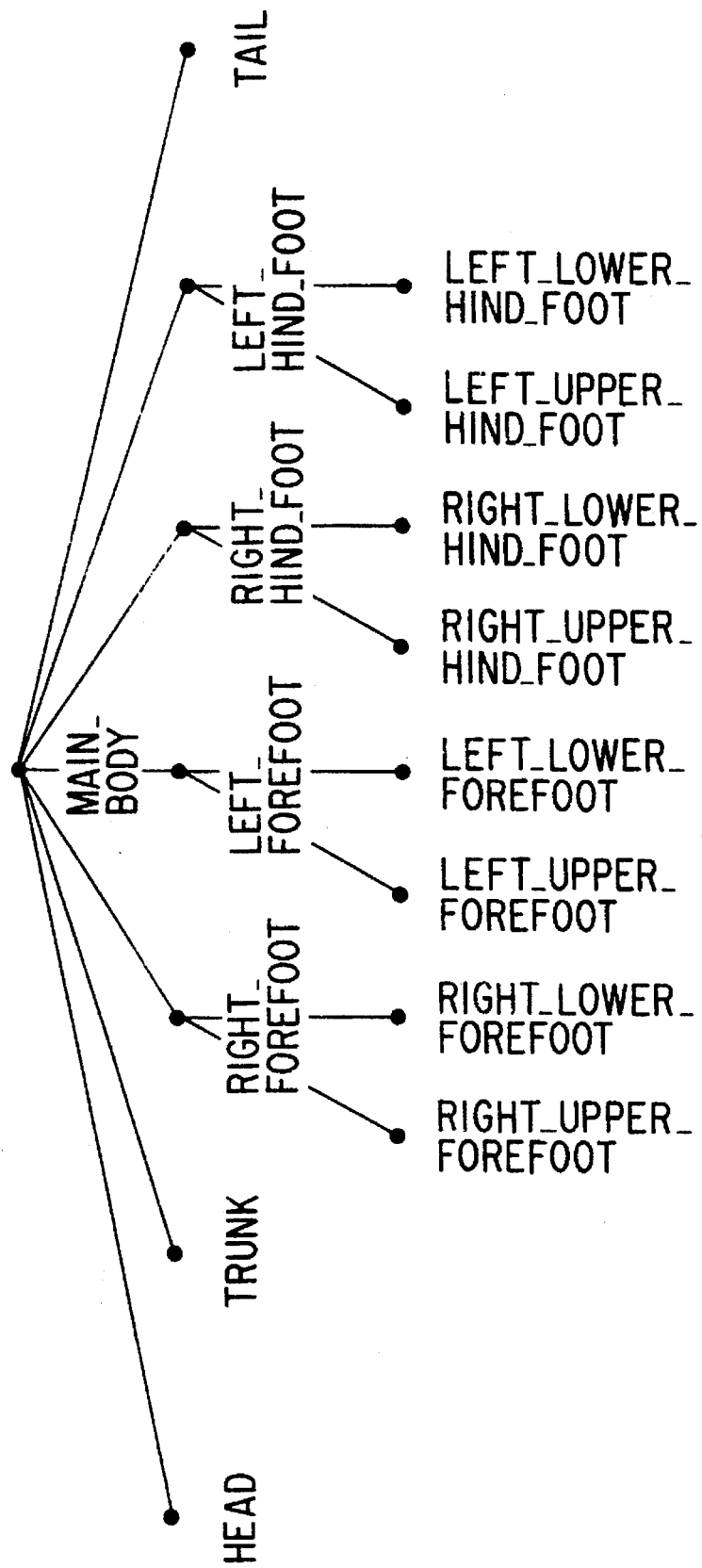
FIG. 18B (FOUR-FOOTED ANIMAL)

LINK ORDER DATA

| WHICH ROLE (WHICH POINT) IS | TO WHICH ROLE (TO WHICH POINT) | LINKED RESULT |
|---|---|---|
| HEAD (P2) | TRUNK (P1) | MAIN BODY |
| RIGHT_ARM (P1-4) | (P3u) | |
| LEFT_ARM (P1-3) | (P4u) | |
| RIGHT_LEG (P1) | (P2r) | |
| LEFT_LEG (P1) | (P2l) | |
| HEAD_PORTION (P2) | NECK (P1) | HEAD |
| RIGHT_LOWER_ARM (P1) | RIGHT_UPPER ARM (P2) | RIGHT_ARM |
| LEFT_LOWER_ARM (P1) | LEFT_UPPER_ARM (P2) | LEFT_ARM |
| RIGHT_LOWER_LEG (P1) | RIGHT_UPPER LEG (P2) | RIGHT_LEG |
| LEFT_LOWER_LEG (P1) | LEFT_UPPER LEG (P2) | LEFT_LEG |

P~ : LINK POSITION DATA

FIG. 19

LINK FORMAT DATA

| ROLE | TO WHICH DIRECTION (ANGLE) | | | | ROLE | TO WHICH DIRECTION (ANGLE) | | | |
|---|---|---|---|---|---|---|---|---|---|
| | ROTATION AXIS | x | y | z | | ROTATION AXIS | x | y | z |
| HEAD | ↑ | 0 | 0 | 0 | HEAD_PORTION | ↑ | 0 | 0 | 0 |
| TRUNK | ↑ | 0 | 0 | 0 | NECK | ↑ | 0 | 0 | 0 |
| RIGHT_ARM | ↑ | 0 | 0 | 0 | RIGHT_LOWER_ARM | ↑ | 0 | 0 | 0 |
| LEFT_ARM | ↑ | 0 | 0 | 0 | LEFT_LOWER_ARM | ↑ | 0 | 0 | 0 |
| RIGHT_LEG | ↑ | 0 | 0 | 0 | RIGHT_LOWER_LEG | ↑ | 0 | 0 | 0 |
| LEFT_LEG | ↑ | 0 | 0 | 0 | LEFT_LOWER_LEG | ↑ | 0 | 0 | 0 |

F I G. 20

| COMPONENT EXAMPLE |
|---|
| CUBE, RECTANGULAR PARALLELEPIPED |
| SPHERE |
| CONIC_TRAPEZOID |
| COLUMN_SQUARE PILLAR |
| FACE_OF HUMAN_BEING |
| DOG'S_FACE |
| etc |

FIG. 23

| SUBSTANCE NAME |
|---|
| HUMAN BEING MALE, FEMALE |
| RABBIT |
| EAGLE |
| DOG |
| CAT |
| AUTOMOBILE |
| etc |

FIG. 26

LEVEL-A

LEVEL-B

| TREE NAME | SUBSTANCE NAME | DEFORM DATA ||| 
|---|---|---|---|---|
| | | ROLE | ITEM | DATA |
| BIPED_ANIMAL | HUMAN BEING | RIGHT_ARM | (WHICH DIRECTION) | ╱ (Z = −15.0°) |
| | | LEFT_ARM | (WHICH DIRECTION) | ╲ (Z = 15.0°) |
| | DOG | RIGHT_ARM | WHICH POINT | $P3u'$ |
| | | LEFT_ARM | ( ″ ) | $P4u'$ |
| | | RIGHT_LEG | ( ″ ) | $P2r'$ |
| | | LEFT_LEG | ( ″ ) | $P2\ell'$ |
| | | | | |

FIG. 27

MOVEMENT DATA

| ACTION ATTRIBUTE | NODE WITH ACTION | PAUSE ANGLE | | | RANGE | | |
|---|---|---|---|---|---|---|---|
| | | ROTATION AXIS | | | ROTATION AXIS | | |
| | | x | y | z | x | y | z |
| WALK | RIGHT_ARM | 30 | 0 | 0 | 30~-30 | 0 | 0 |
| | LEFT_ARM | -30 | 0 | 0 | 30~-30 | 0 | 0 |
| | RIGHT_LEG | -15 | 0 | 0 | 15~-15 | 0 | 0 |
| | LEFT_LEG | 15 | 0 | 0 | 15~-15 | 0 | 0 |
| | RIGHT_LOWER_ARM | 0 | 0 | 0 | 0~-30 | 0 | 0 |
| | LEFT_LOWER_ARM | -30 | 0 | 0 | 0~-30 | 0 | 0 |
| | RIGHT_LOWER_LEG | 0 | 0 | 0 | 30~0 | 0 | 0 |
| | LEFT_LOWER_LEG | 30 | 0 | 0 | 30~0 | 0 | 0 |
| RUN | RIGHT_ARM | 30 | 0 | 0 | 30~-30 | 0 | 0 |
| | LEFT_ARM | -30 | 0 | 0 | 30~-30 | 0 | 0 |
| | RIGHT_LEG | -30 | 0 | 0 | 30~-30 | 0 | 0 |
| | LEFT_LEG | 30 | 0 | 0 | 30~-30 | 0 | 0 |
| | RIGHT_LOWER_ARM | 90 | 0 | 0 | 90 | 0 | 0 |
| | LEFT_LOWER_ARM | 90 | 0 | 0 | 90 | 0 | 0 |
| | RIGHT_LOWER_LEG | -90 | 0 | 0 | 90~-90 | 0 | 0 |
| | LEFT_LOWER_LEG | -90 | 0 | 0 | 90~-90 | 0 | 0 |

FIG. 28

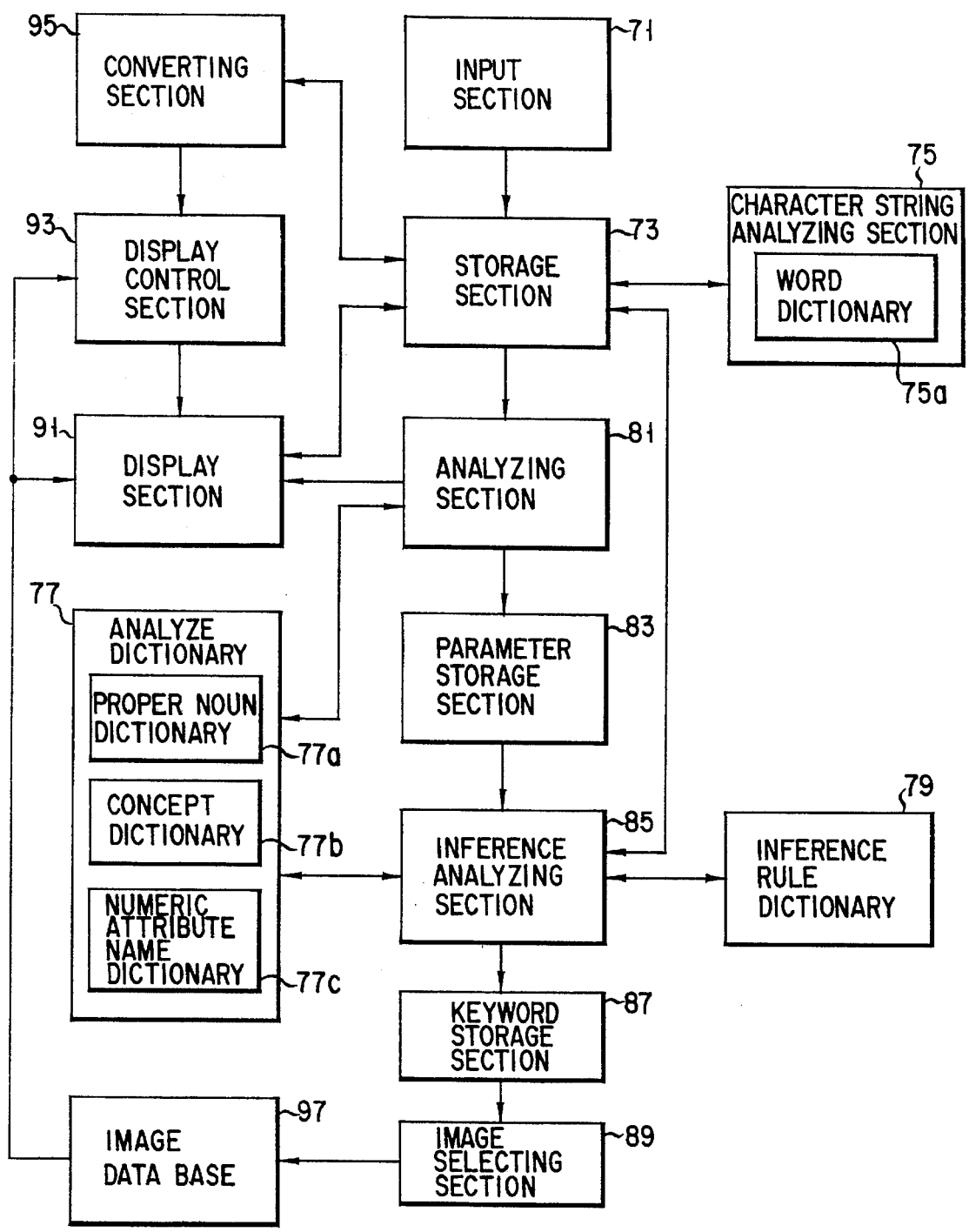
F I G. 38

| PROPER NOUN | CATEGORY |
|---|---|
| JAPAN | COUNTRY |
| USA | COUNTRY |
| GERMANY | COUNTRY |
| COMPANY A | ENTERPRISE |
| COMPANY B | ENTERPRISE |
| COMPANY C | ENTERPRISE |
| RED RUNNER | AUTOMOBILE |
| BLACK PENCIL | STATIONERY |
| RED PENCIL | STATIONERY |
| BLUE PENCIL | STATIONERY |

F I G. 39

| WORD REPRESENTING NUMERIC ATTRIBUTE | NUMERIC ATTRIBUTE NAME IN CONCEPT DICTIONARY |
|---|---|
| SALES | SALES |
| SALES | SALES |
| PRODUCING NUMBER | PRODUCING NUMBER |
| MANUFACTURING NUMBER | PRODUCING NUMBER |
| YIELDING NUMBER | PRODUCING NUMBER |
| PROFIT | PROFIT |
| BENEFIT | PROFIT |
| GAIN | PROFIT |

| ENTERPRISE | | |
|---|---|---|
| MAIN CATEGORY | GROUP | |
| ATTRIBUTE NAME | VALUE | |
| SALES | SERVICE, GROSS SALES OF PRODUCTS, THE UPPER THE BETTER | |
| PROFIT | (SALES)-(COST), THE UPPER THE BETTER | |
| COST | (PERSONAL EXPENSES)+(MATERIAL COST)+(WORKING COST), THE LESSER THE BETTER | |
| NUMBER OF EMPLOYEES | NUMBER OF PERSONS | |
| SALES OBJECT | PRODUCT, SERVICE | |

FIG. 40B

| ENTERPRISE | |
|---|---|
| MAIN CATEGORY | OBJECT |
| ATTRIBUTE NAME | VALUE |
| SELLING AGENCY | ENTERPRISE, COUNTRY, INDIVIDUAL |
| SALES | AMOUNT |
| PRICE | AMOUNT |
| OBJECT INFLUENCING ON RUNNING COST | PRODUCT, ENERGY |
| PRODUCTION AMOUNT | NUMBER OF ITEMS |

FIG. 40C

| AUTOMOBILE | |
|---|---|
| MAIN CATEGORY | PRODUCT |
| ATTRIBUTE NAME | VALUE |
| SELLING AGENCY | ENTERPRISE |
| OBJECT INFLUENCING ON RUNNING COST | OIL |

RULE 1

CAUSE: ( ( CATEGORY-NAME(X) IS PRODUCT )

AND ( NUM-ATTR-NAME(X) IS SALE )

AND ( CHANGE-STATE (NUM-ATTR(X) ) IS DOWN )

AND ( Y IS-SET DEALER(X) )

AND ( CATEGORY-NAME(Y) IS INDUSTRY )

AND ( NUM-ATTR-NAME(Y) IS SALE )

)

EFFECT: ( CHANGE-STATE (NUM-ATTR(Y) ) IS-SET UP )

RULE 2

CAUSE: ( ( CATEGORY-NAME(X) IS PRODUCT )

AND ( NUM-ATTR-NAME(X) IS SALE )

AND ( CHANGE-STATE (NUM

AND ( Y IS-SET DEALER(X) )

AND ( CATEGORY-NAME(Y) IS INDUSTRY )

AND ( NUM-ATTR-NAME(Y) IS SALE )

)

EFFECT: ( CHANGE-STATE (NUM-ATTR(Y) ) IS-SET UP )

F I G. 42A

```
RULE 3
    CAUSE: ((CATEGORY(X) IS PRODUCT)
          AND (Y IS-SET RUNNING-EFFECTER(X))
          AND (NUM-ATTR-NAME(Y) IS PRICE)
          AND (CHANGE-STATE(NUM-ATTR(Y) IS-UP)
          )
    EFFECT: (CHANGE-STATE(NUM-ATTR(X)) IS-SET DOWN)

RULE 4
    CAUSE: ((CATEGORY(X) IS PRODUCT)
          AND (Y IS-SET RUNNING-EFFECTER(X))
          AND (NUM-ATTR-NAME(Y) IS PRICE)
          AND (CHANGE-STATE(NUM-ATTR(Y)) IS DOWN)
          )
    EFFECT: (CHANGE-STATE(NUM-ATTR(X)) IS-SET UP)
```

FIG. 42B

|  | PRICE | SALES | PRODUCTION COST |
|---|---|---|---|
| BLACK PENCIL | 70 | 17,000,000 | 50 |
| RED PENCIL | 70 | 15,000,000 | 55 |
| BLUE PENCIL | 65 | 18,000,000 | 50 |
| [TITLE: SALES AMOUNT OF PENCIL (1985)] | | | |

F I G. 44

|  | 1971 | 1972 | 1973 | 1974 |
|---|---|---|---|---|
| COMPANY A | 100 | 120 | 110 | 100 |
| COMPANY B | 150 | 170 | 120 | 120 |
| COMPANY C | 100 | 120 | 110 | 110 |
| [TITLE: SALES AMOUNT OF LARGE COMPANIES A, B, AND C] | | | | |

F I G. 45

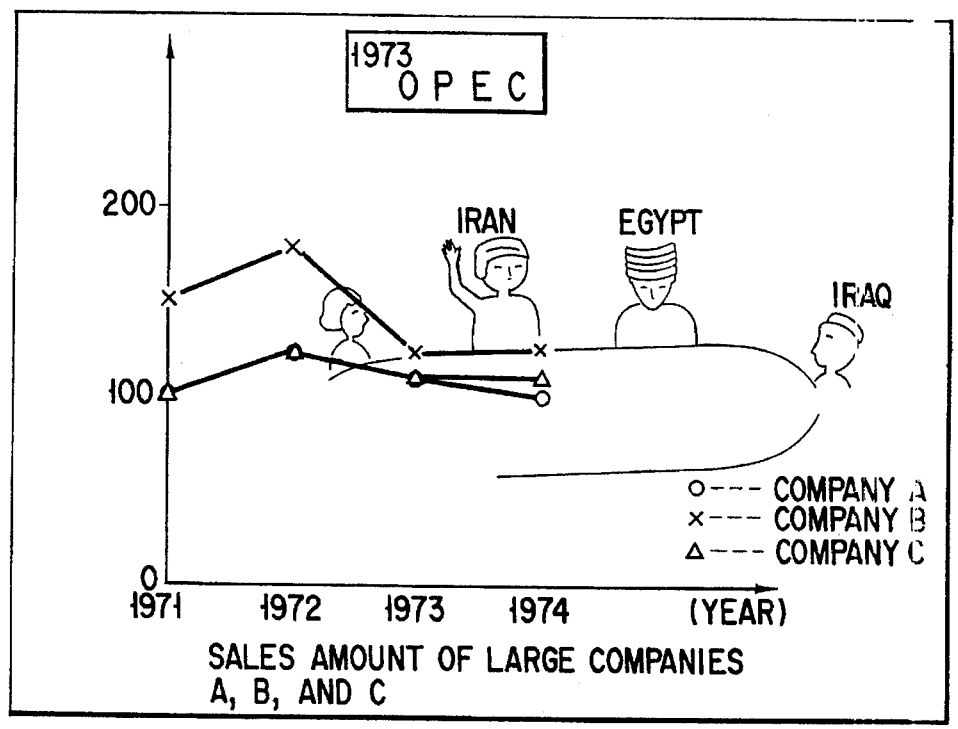
F I G. 46
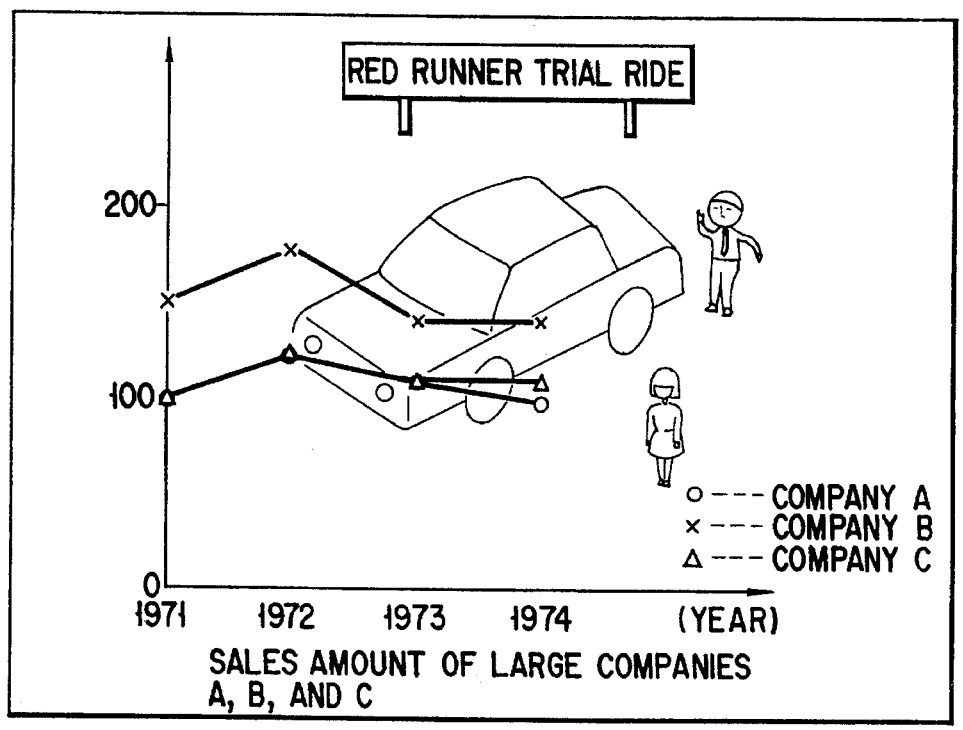
F I G. 47

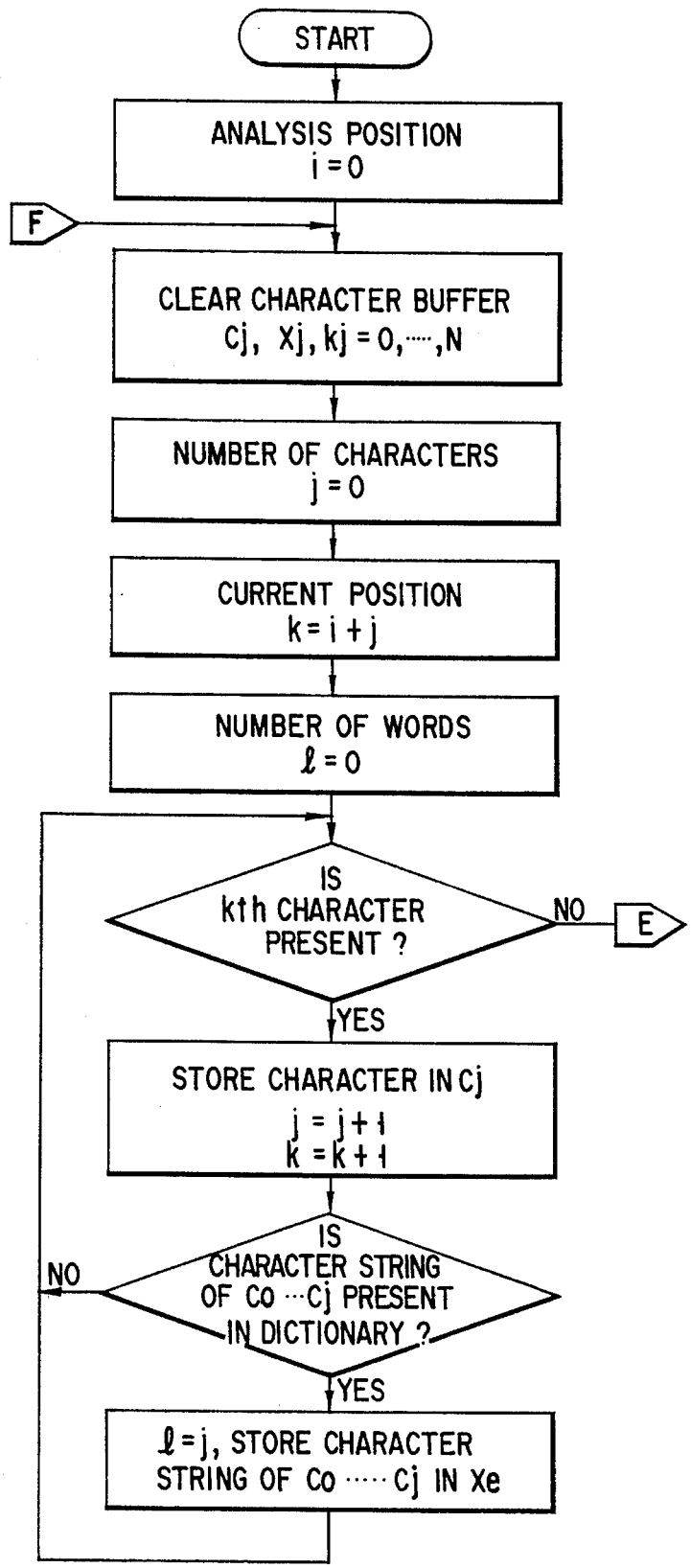
F I G. 48A

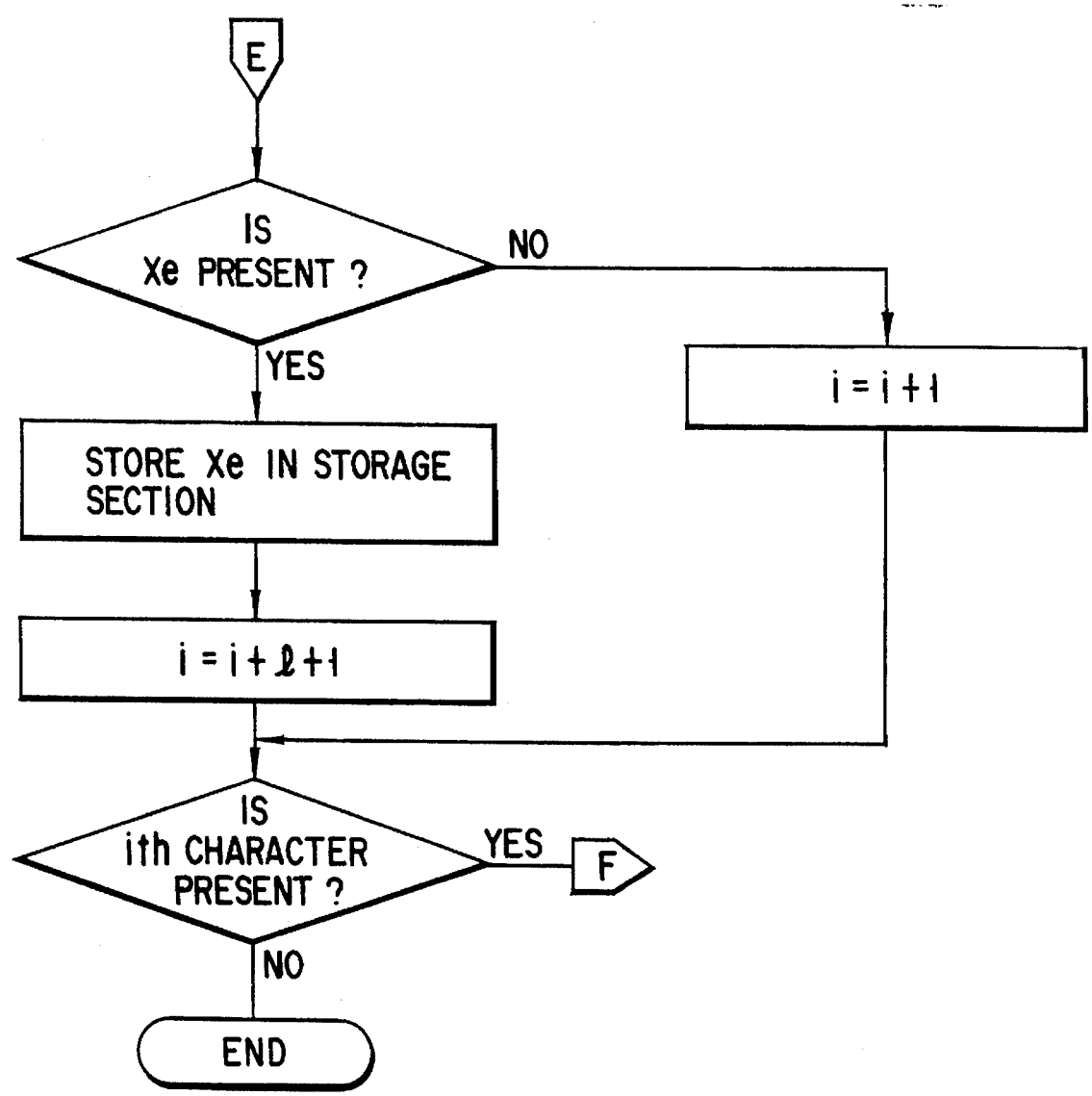
F I G. 48B

PRESENTATION SUPPORT SYSTEM

BACKGROUND OF THE INVENTION

1. Field of the Invention

The present invention relates to a presentation support system which can facilitate formation of materials for presentation, thereby effectively supporting the presentation.

2. Description of the Related Art

In order to form materials for presentation, it is necessary to collect data associated with the contents of presentation and to consider a method of presenting (representing) the collected data in accordance with the contents of data. Therefore, it generally takes a very long time to form materials. However, it is generally very difficult to collect a satisfactory amount of data required to form presentation materials. In addition, it is in many cases hard to determine a method of effectively presenting the collected data. For these reasons, formation of presentation materials which can satisfactory attract attention of audience is not easy, and formed presentation materials are often interpreted in a manner which is different from the intention of presentation.

"Lotus 1-2-3" available from Lotus Development Corporation, for example, is known as a means for forming presentation materials. This apparatus (system) converts, e.g., item names, attribute values for the respective items, and titles, which are input in the form of a table by a user as shown in FIG. 1, into the form of a graph designated by the user, as shown in FIG. 2, and outputs this graph. That is, the system represents collected (user-input) numeric data in a user-designated representation form, such as a bar chart or a line graph, and uses this as a picture for presentation materials. The use of such a means makes it possible to relatively easily form neat graphs to be used as presentation materials.

It is hard to say, however, that data thus graphically illustrated satisfactorily represents the contents of data to be interpreted or its background data. In addition, the level of requirements of users has been increased recently as these graphic techniques have been developed. That is, a demand has increasingly arisen for a system which can not only perform transmission of superficial data but also visualize contents to be represented using formed graphs more clearly.

Conventionally, as described above, it is generally difficult to easily form presentation materials. For example, in order to represent the contents of data in the form of a graph using a photograph or the like, which is used to communicate the intention of presentation, for a background, a presenter must perform a work of cutting and pasting the graph, which is formed on the basis of the collected data, on the photograph or the like. In addition, it is very difficult to obtain presentation data such as images or sounds adapted to the intention of presentation, and this further increases a work-load.

Conventionally, in generating desired object data by means of such computer graphics, a graphics designer designs individual data by using modeling software or the like.

When, however, it is required to make a change in object data once completed in this manner, the entire object data must be generated again from the beginning because existing modeling software does not have control points enough to meet the modification in object data.

For this reason, modeling software capable of simplifying generation and modification of object data has been developed. This software constitutes object data using a plurality of components and selectively combines necessary components from various prepared components, thereby generating desired object data. When object data need be changed, the software replaces a component to be changed with another to modify the object data.

This modeling software, however, has a problem that when formed components are to be combined, the sizes of the components or the link relationships between the components must be reset, and this results in a cumbersome operation.

As a method of creating a moving object, a method of integrally defining an entire object (like a meta ball) and a method of linking primitives are available. The latter method can be handled more easily than the former in defining a complicated object in motion. As described in "Formation of Animation by Interactive Script Method" (Data Processing Society of Japan CG & CAD, February 1989), there is a method of describing primitive link data using an exclusive modeling language.

Conventionally, creation of this linked body has been attempted by simultaneously linking primitives in parallel, and the link data has been described exclusively for each of moving objects as position data which is derived from the shape of a primitive figure to be linked and is used to link the primitives. For this reason, when moving objects to be represented are increased in number, the amount of data is also increased. In addition, when, for example, an upper arm of a human being, which is represented by a cube, is to be represented by a rectangular parallelepiped, data of the entire human being is newly required. This makes it difficult to perform local deletion and re-creation.

Conventional animation generation methods, for example, a method disclosed in Published Unexamined Japanese Patent Application No. 1-193974 gives movement to an object using a new function and parameters in an environment having an influence and does not relate to a method of creating an object. Therefore, in representing the movement of an object itself, not only a complicated function is required, but also the processing amount and the data quantity are doubled in order to perform both creation of the object and representation of the movement. In addition, when an object is created by a linked body as described above, in order to move a limb constituted by an arm and a hand, for example, the movement of the hand must be described in consideration of the movement of the arm so that the arm and the hand are not separated from each other. That is, since the movements of all of linked primitives are related to each other, description of data for giving the movements is complicated.

In an image generated by calculations performed by a computer, the presence of shadows makes a large contribution for human beings to recognize the state of a three-dimensional space represented by the image. For this reason, various methods of calculating shadows also have been studied in the field of computer graphics.

In the field of such computer graphics, a demand has arisen for an application of simulating an indoor space realistically and interactively as the range of applications of this field has been widened. The characteristic feature of the indoor space is that a plurality of light sources, such as spotlights, each of which has illumination characteristics such as a brightness, a color, and a manner of spread of light are present, and these light sources give brightness to objects and produce shadows. Since real light sources have their "sizes", "soft shadows" with indefinite shadow boundaries are produced. Therefore, the field of computer graphics also requires a technique capable of calculating soft shadows obtained by light sources having illumination characteristics.

As representative examples of such a technique, the following various methods have been conventionally proposed.

(a) A method of performing simple mapping by using a single light source. According to this method, it is possible to perform processing with a low calculation cost and to produce a pseudo shadow at a high speed. In addition, since a shadow is projected only on a flat plane, a shadow with a sharp boundary can be obtained.

(b) A method of correctly calculating the boundary of a shadow by using perfect parallel light or a point source with no size as a model. This method provides a shadow having a sharp boundary. However, an arithmetic operation cost is significantly increased as light sources are increased in number.

(c) A method of calculating a distance that light travels from a light source by using a Z buffer method and determining upon application of the Z buffer method from a view point whether a point of each depth is a shadow. This method can produce soft shadows with its high representation power. However, the method requires a high calculation cost and a large memory.

(d) A method of calculating an equilibrium state of exchange of optical energy between objects by using a perfect diffusion light source as a model assuming that objects other than the light source absorb or radiate light. In this method, although a shadow having a soft boundary can be produced, the calculation cost is very high. For this reason, a method of gradually calculating the exchange of optical energy to update an image to one having a higher quality stepwise is also available. However, the calculation cost of this method is still high.

Thus, of these conventional methods as described above, those which can provide a high-speed display with a low cost can produce only a shadow with a sharp boundary. On the other hand, those which can produce a soft shadow require a high calculation cost and therefore cannot be used in an interactive system.

SUMMARY OF THE INVENTION

It is an object of the present invention to provide a highly practical presentation support system which can easily and effectively form presentation materials based on various collected data and can effectively add background data such as images or sounds to these presentation materials.

It is another object of the present invention to provide a structure generating apparatus which can easily generate various types of graphic structures.

It is still another object of the present invention to provide a structure generating method which can represent various action patterns of moving objects which are entirely or locally different from one another by using a small amount of data without describing the patterns in different programs.

It is still another object of the present invention to provide a figure processing apparatus which can produce a soft shadow obtained by a light source with illumination characteristics with a low calculation cost and is therefore expected to be used in an interactive system based on computer graphics.

According to the structure generating apparatus of the present invention, simply by designating link selecting conditions, local selecting conditions, and component selecting conditions with respect to a basic structural component, a component suited to these conditions can be selected. Therefore, it is possible to select a component either at random or in accordance with designated conditions. As a result, mannerism in object data can be prevented. In addition, a correspondence with feature conditions is described for each component. Therefore, even when components are increased in number, descriptions need only be added to these new components. Furthermore, in order to increase the number of object data, only the conditions of new object data need be added regardless of components. That is, this apparatus can generate a graphic structure having a desired arrangement with easy handling.

According to the structure generating method of the present invention, a link order and link format data are defined for each classification which defines one type of a structure. Therefore, it is possible to represent a large number of structures having different types of primitive figures for forming components and different levels in details of structures without preparing different programs or data for the respective structures. In addition, replacement of components of a structure once arranged or deletion of its given local portion can be easily performed. Furthermore, by locally defining movement data as a rotation about a link node for each component, a moving object can be easily produced.

The figure processing apparatus of the present invention approximates an object to be displayed by a polyhedron and classifies polygons constituting this polyhedron into light-source polygons and non-light-source polygons. The apparatus calculates the distribution of optical energies in units of wavelengths from each light-source polygon to the non-light-source polygons. The apparatus also calculates a sum of the optical energies in units of wavelengths from the individual light-source polygons for each non-light-source polygon and determines the display color of each non-light-source polygon from this sum of optical energies, thereby displaying these polygons.

In order to calculate the distribution of optical energies from each light-source polygon to the non-light-source polygons, the distribution is weighted in accordance with the radiation angle of light so as to reflect the illumination characteristics of the light source.

In addition, the apparatus checks whether each non-light-source polygon is displayed in a projection calculation from a view point and checks whether a non-light-source polygon determined not to be displayed has an effect on an optical energy distribution calculation of a polygon which is displayed. Therefore, the optical energy distribution calculation from each light-source polygon need only be performed for non-light-source polygons determined to be displayed and non-light-source polygons which may have influences on distribution calculations of the non-light-source polygons to be displayed. This makes it possible to perform shadowing with a low calculation cost.

As a result, according to the present invention, a three-dimensional object display with soft shadows obtained by a plurality of light sources, which is necessary in simulation of, e.g., an indoor space, can be obtained at a high speed. In addition, the use of light sources with illumination characteristics enables simulation of radiation of light on an object or production of shadows by these light sources.

The presentation support system of the present invention analyzes a category on the basis of input items, attribute values, and titles by using, e.g., a proper noun dictionary, a concept dictionary, and a numeric attribute name dictionary. The system also analyzes changes in attribute values from the analyzed category in accordance with an inference rule, thereby extracting a keyword for describing the background of presentation.

In accordance with this keyword, a background material suitable for the presentation is selected from background materials such as images or sounds. This selected background material is displayed in combination with a graph, which is formed in accordance with content data of an object to be presented, so as not to degrade the visibility of the graph. As a result, it is possible to efficiently form and display presentation materials which can sufficiently clearly represent the contents of the presentation and can also effectively show its background.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 4 and 5 are views showing description contents of a component descripting section used in the embodiment shown in FIG. 3;

FIG. 6 is a view showing description contents of a component condition description section used in the embodiment of FIG. 3;

FIG. 7 is a view showing description contents of a link selecting section shown in the embodiment of FIG. 3;

FIG. 8 is a view showing description contents of a link condition descripting section used in the embodiment of FIG. 3;

FIG. 9 is a view showing description contents of a local selecting section used in the embodiment of FIG. 3;

FIG. 10 is a view showing description contents of a local condition descripting section used in the embodiment of FIG. 3;

FIG. 11 is a view showing description contents of a component selecting section used in the embodiment of FIG. 3;

FIG. 15 is a view showing a graphic structure generated in the embodiment of FIG. 3;

FIG. 17 is a view showing another graphic structure generated in the embodiment of FIG. 3;

FIGS. 18A and 18B are views showing tree structures in which roles representing a biped animal are given to respective nodes and leafs representing two levels;

FIGS. 19 and 20 are views showing link order data and static link format data for constituting the biped animal;

FIG. 23 is a view showing a component example to be given to a leaf;

FIG. 26 is a view showing an example of the substance name;

FIG. 27 is a view showing a modification of the link format data based on the substance name "human being" and "dog";

FIG. 28 is a view showing a dynamic link-format data in action attributes "walk" and "run";

FIG. 38 is a block diagram showing a presentation support system according to the present invention;

FIG. 39 is a view showing a format of a proper noun dictionary;

FIGS. 40A through 40C show formats of a concept dictionary;

FIG. 41 is a view showing a format of a numeric attribute name dictionary;

FIGS. 42A and 42B are views showing a format of an inference rule dictionary;

FIGS. 44 and 45 are views showing input examples, respectively;

FIGS. 46 and 47 are views showing display examples of presentation materials;

FIGS. 48A and 48B are flowcharts showing details of a character string analyzing section shown in FIG. 38.

DETAILED DESCRIPTION OF THE PREFERRED EMBODIMENTS

An embodiment of the present invention will be described below with reference to the accompanying drawings.

Figures 1, 2:
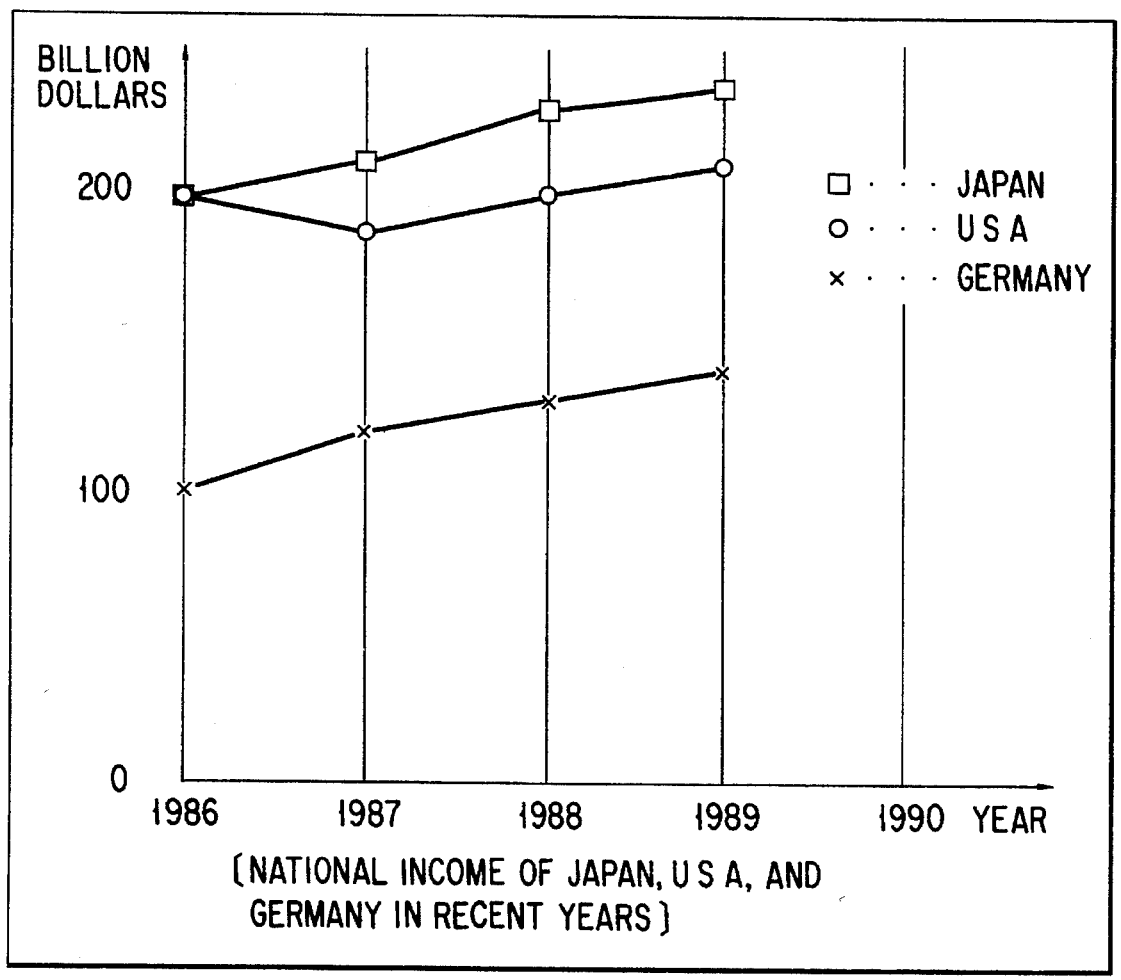
FIG. 1 is a view showing a data input example of a table format in a conventional apparatus.
FIG. 2 is a view showing a conventional presentation material using a graph.
Figure 3:
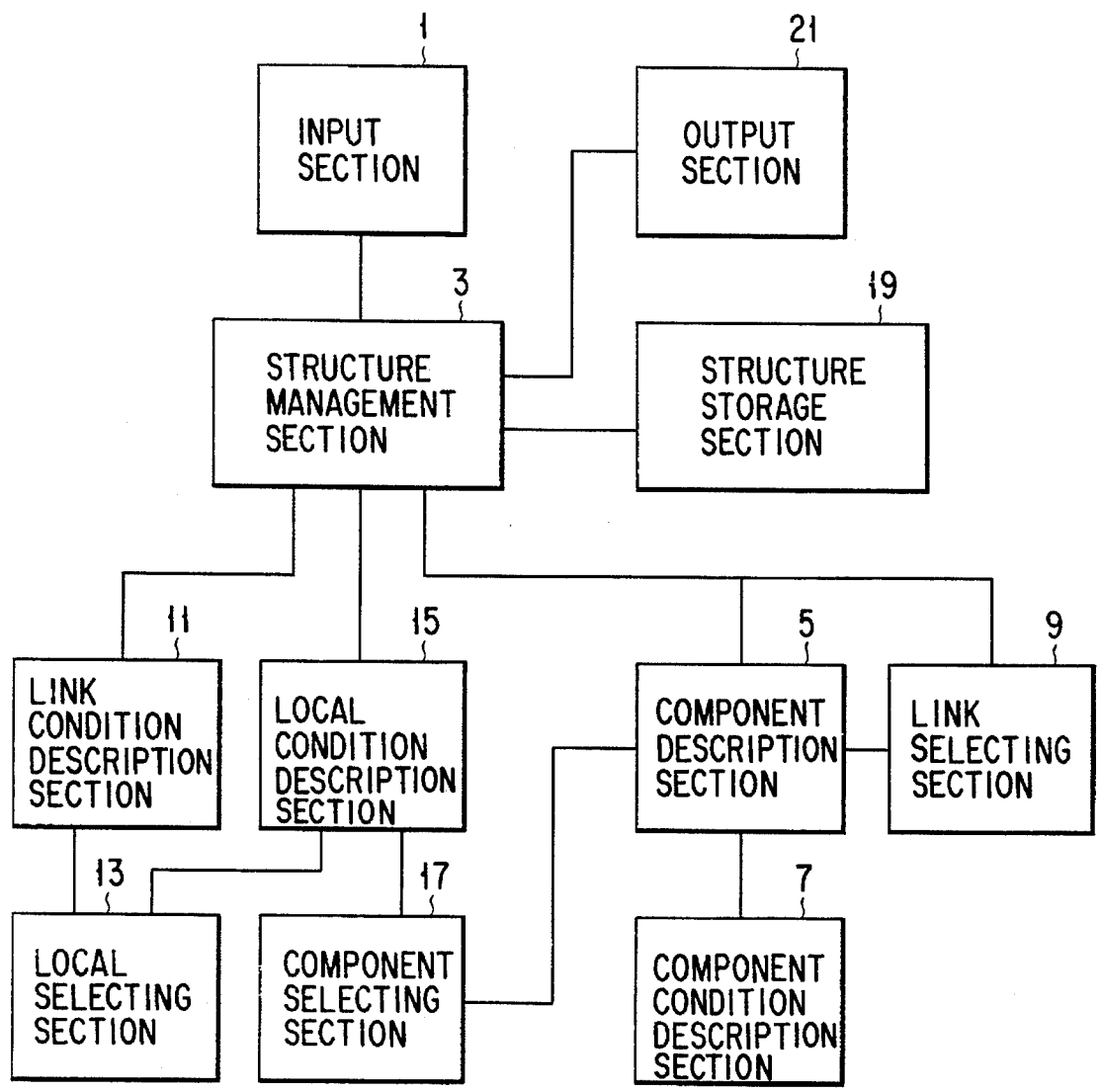
FIG. 3 is a block diagram showing an embodiment of a structure generating apparatus according to the present invention.

FIG. 3 schematically shows the arrangement of a structure generating apparatus according to the present invention which can easily generate various graphic structures. Referring to FIG. 3, an input section 1 is constituted by, e.g., a keyboard and a mouse and used to perform input operations such as various selections and designations required to generate a desired graphic structure.

Input data from the input section 1 is supplied to a structure management section 3.

The structure management section 3 totally manages exchange of various data between a component description section 5, a component condition description section 7, a link selecting section 9, a link condition description section 11, a local selecting section 13, a local condition description section 15, a component selecting section 17, a structure storage section 19, and an output section 21 (all of which will be described in detail later).

The component description section 5 describes characteristic conditions, such as a color or a length, of each constituting component (e.g., a sphere or a human being) of an object, which are required to produce the component and do not depend on the characteristic features of the component. FIGS. 4 and 5 show a practical example of this component description section 5. Referring to FIGS. 4 and 5, an origin coordinate, a sub component, a local condition, and a link condition are defined first as a basic type of "component", and then attributes of each constituting component, such as "sphere" or "human being", are defined.

In this embodiment, for a constituting component "sphere", "component" is defined as "super class", and various attributes such as "vertical radius", "horizontal radius", "color", "texture", "possible local condition (for designating an approximated shape of a local bounding box)", and "possible link condition" are also defined. Likewise, various attributes are defined for a constituting component "human being".

In this case, when "component" is defined as "super class", all attributes of "component" are succeeded. If the same attributes as those of "component" are defined again, the attributes of "component" are replaced with these redefined attributes. In the case of "sphere" described above, for example, "origin coordinate" and "sub component" of the attributes of "component" are succeeded, but "possible local condition" and "possible link condition" thereof are not succeeded because they are redefined.

The component condition description section 7 describes a correspondence of each constituting component with characteristic conditions. FIG. 6 shows a practical example of this component condition descriptor section 7, in which component conditions related to "rectangular parallelepiped" or "sphere" are described.

The link selecting section 9 describes link selecting conditions for each constituting component. FIG. 7 shows a practical example of this link selecting section 9, in which conditions such as "smooth", "normal", and "dynamic" concerning "human being" are described as the link selecting conditions.

The link condition description section 11 describes link conditions for each constituting component. FIG. 8 shows a practical example of this link condition descriptor section 11, in which link conditions associated with "one link" and "two links" are described.

The local selecting section 13 describes selecting conditions for local conditions of each constituting component. FIG. 9 shows a practical example of this local selecting section 13, in which local conditions with respect to "dynamic" and "normal" are described as selecting conditions concerning "two links".

The local condition description section 15 describes local conditions for each constituting component. FIG. 10 shows a practical example of the local condition description section 15, in which local conditions for "rectangular parallelepiped approximation" are described.

The component selecting section 17 describes selecting conditions of each constituting component. FIG. 11 shows a practical example of this component selecting section 17, in which component conditions with respect to "smooth" and "normal" are described as selecting conditions for "rectangular parallelepiped approximation".

The structure storage section 19 stores each component obtained by the respective selecting operations in the link selecting section 9, the local selecting section 13, and the component selecting section 17 as object data with a network structure or a hierarchical structure.

The output section 21 is constituted by, e.g., a color graphic display and displays object data based on the network or hierarchical structure stored in the structure storage section 19.

The operation of this embodiment having the above arrangement will be described below.

A case in which an arrangement of "human being" is generated under a condition of "normal" will be described. First, when a command indicating generation of a graphic structure is input from the input section 1, the structure management section 3 refers to the description of the component description section 5 shown in FIGS. 4 and 5 to produce an instance (as a substance) of a constituting component "human being".

In this case, for the constituting component "human being", "component" is defined as "super class", and attributes "stature", "width", "color", "texture", "possible local condition", and "possible link condition" are respectively defined. Therefore, all attributes of "component" defined as "super class" are succeeded. However, "possible local condition" and "possible link condition" are not succeeded because they are redefined.

Figure 12:
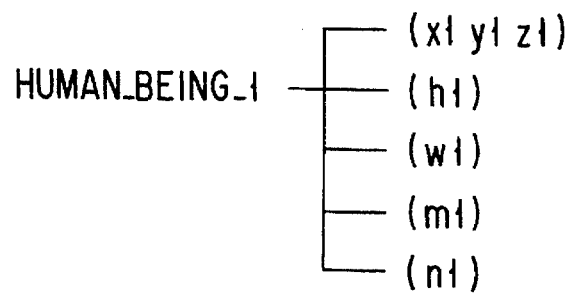
FIGS. 12, 13, 14 and 16 are views for explaining storing in a hierarchical structure in a structure storage section in the embodiment of FIG. 3.

As a result, data with a hierarchical structure shown in FIG. 12 is stored as instance data of the component "human being" in the structure storage section 19. This instance data includes "origin coordinate (xl,yl,zl)", "stature (hl)", "width (wl)", "color (ml)", and "texture (nl)", and actual values are substituted into these data.

The structure management section 3 then refers to the description of the link selecting section 9 shown in FIG. 7 to select a link condition corresponding to the selecting condition "normal". In this case, "two links" is selected as the link condition corresponding to the selecting condition "normal". Note that although a link condition corresponding to a given selecting condition is selected in this embodiment, the link condition may be selected randomly by, e.g., generating random numbers.

Figure 13:
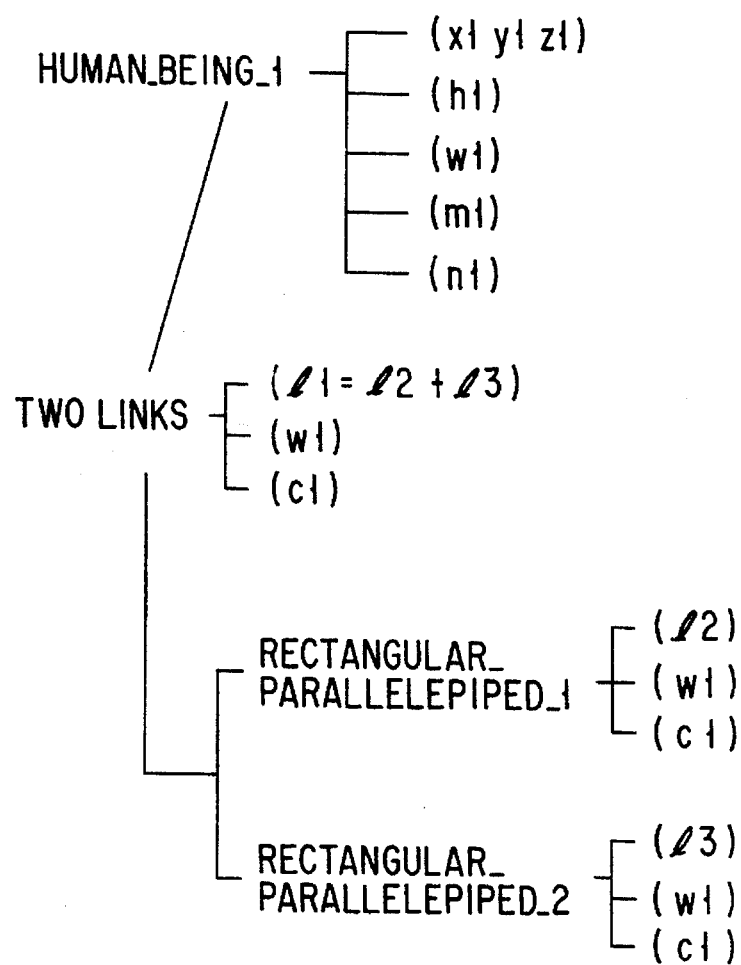

The structure management section 3 refers to the description of the link condition descriptor section 11 shown in FIG. 8 to generate an instance corresponding to the link condition "two links". In this case, for the link condition "two links", "one link" is defined as "super class", and conditions "possible local condition", "component 2", and "constraint" are defined. As a result, all attribute conditions of "one link" defined as "super class" are succeeded, but "possible local condition" and "constraint" are not succeeded because they are redefined. As a result, the structure storage section 19 stores object data with a hierarchical structure, in which data of the link condition "two links" is added to the selecting condition "normal" as shown in FIG. 13, as instance data of the constituting component "human being".

The structure management section 3 refers to the description of the local selecting section 13 shown in FIG. 9 to select a local condition corresponding to the selecting condition "normal". In this case, "component 1 (rectangular parallelepiped approximation 1)" and "component 2 (rectangular parallelepiped approximation 2)" are selected as the local condition corresponding to the selecting condition "normal". Here again, although a local condition is selected in accordance with a given selecting condition in this embodiment, the local condition may be selected at random by, e.g., generating random numbers.

An instance associated with these "component 1 (rectangular parallelepiped approximation 1)" and "component 2 (rectangular parallelepiped 2)" is produced by referring to the description of the local condition descriptor section 15 shown in FIG. 10. In this case, "rectangular parallelepiped approximation" defines conditions "length (12)", "width (w2)", "color (c2)", "substance", "constraint", and "possible component". The attribute values of these conditions are so combined as to satisfy the constraint of "two links" described in the link condition descriptor section 11 shown in FIG. 8, thereby obtaining object data with a hierarchical structure shown in FIG. 13.

The structure management section 3 refers to the description of the component selecting section 17 shown in FIG. 11 to select a component condition corresponding to the selecting condition "normal". In this embodiment, "substance (rectangular parallelepiped)" is selected as the component condition corresponding to the selecting condition "normal". Here again, although a component condition corresponding to a given selecting condition is selected in this embodiment, the component condition may be randomly selected by, e.g., generating random numbers.

Figure 14:
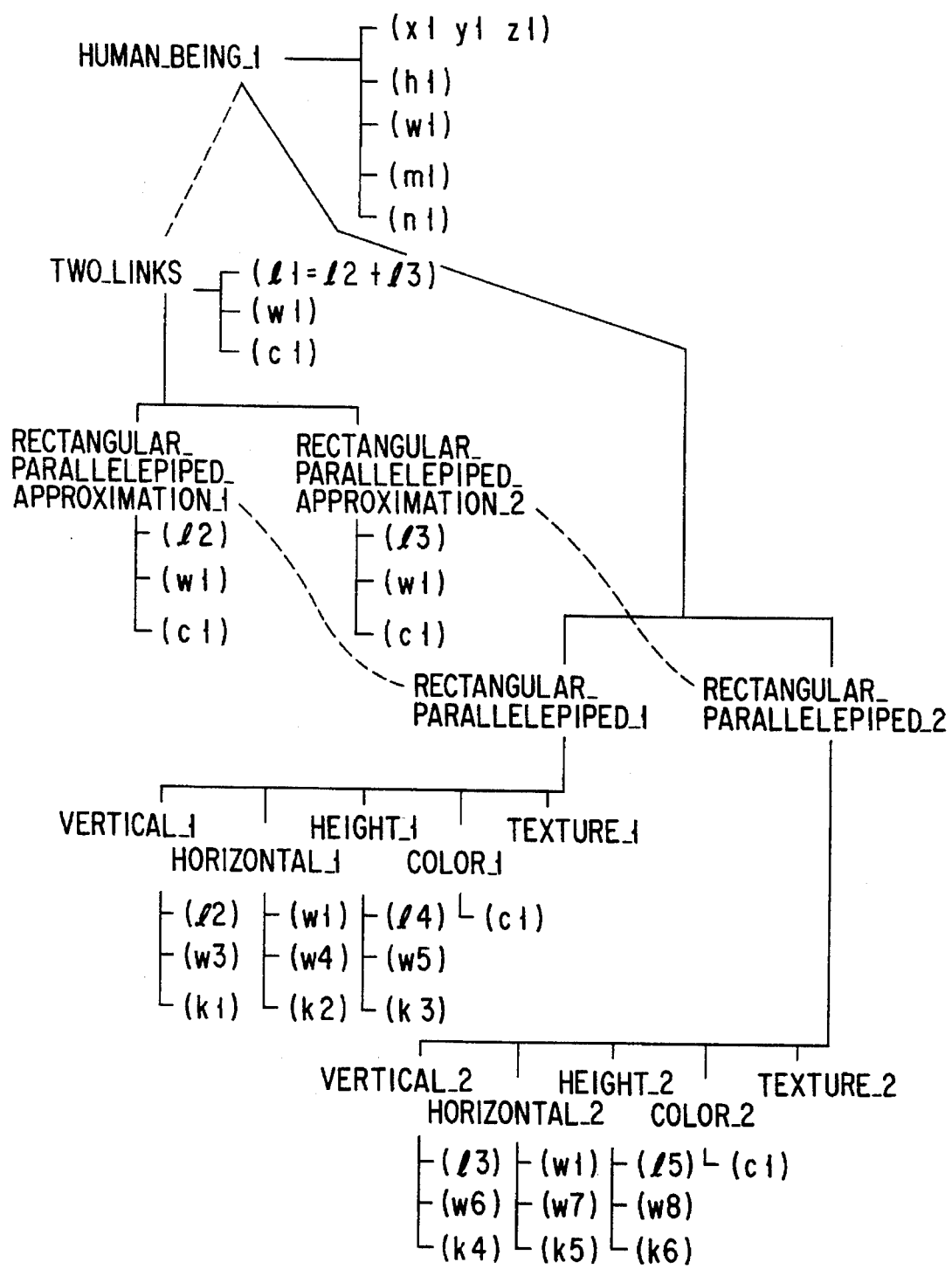

An instance associated with this "substance (rectangular parallelepiped)" is produced by referring to the description of the component descriptor section 5 shown in FIG. 4 and the description of the component condition description section 7 shown in FIG. 6, and object data with a hierarchical structure as shown in FIG. 14 is written in the structure storage section 19. In this case, as shown in FIG. 14, data of vertical 1, horizontal 1, height 1, color 1, and texture 1 are set for rectangular parallelepiped 1 corresponding to rectangular parallelepiped approximation 1, and data of vertical 2, horizontal 2, height 2, color 2, and texture 2 are set for rectangular parallelepiped 2 corresponding to rectangular parallelepiped approximation 2.

This hierarchical object data in the structure storage section 19 is output to the output section 21 via the structure management section 3. As a result, as shown in FIG. 15, a graphic structure of "human being" constituted by two rectangular parallelepipeds generated under the condition "normal" can be displayed.

In order to change a part of this graphic structure, e.g., to change the head portion of "human being" to "sphere" from this state, the selecting condition is changed to "smooth" when the structure management section 3 refers to the description of the component selecting section 17. Consequently, "substance (sphere)" is selected as a component condition corresponding to the selecting condition "smooth" by referring to the description of the component selecting section 17 shown in FIG. 11.

Figure 16:
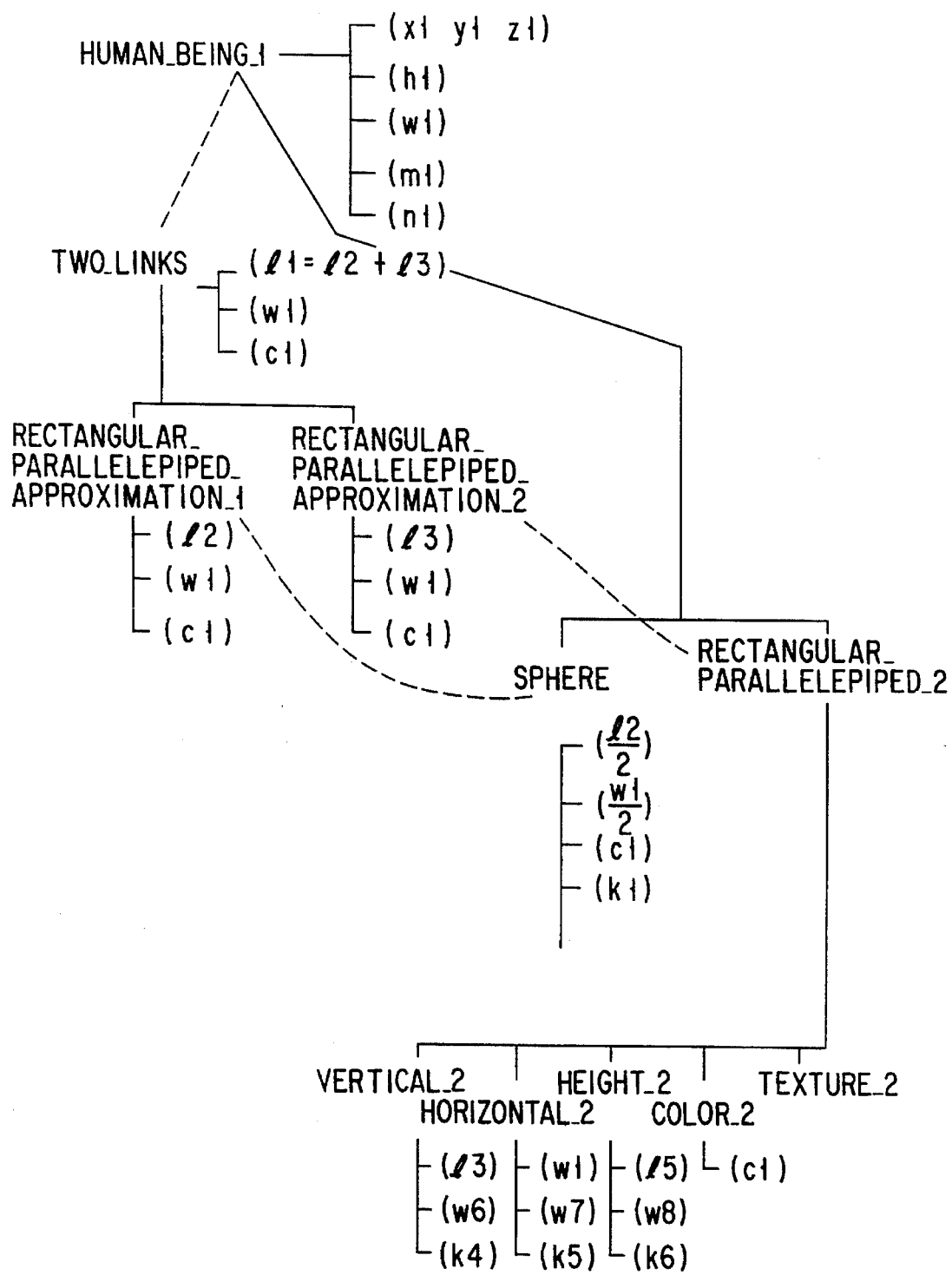

When an instance associated with "substance (sphere)" is thus generated by referring to the description of the component description section 5 shown in FIG. 4 and the description of the component condition description section 7 shown in FIG. 6, the object data with a hierarchical structure stored in the structure storage section 19 is rewritten as shown in FIG. 16. This hierarchical object data in the structure storage section 19 is output to the output section 21 via the structure management section 3, and this makes it possible to display a graphic structure of "human being" constituted by a rectangular parallelepiped and a sphere as shown in FIG. 17.

Note that the present invention is not limited to the above embodiment but can be variously modified without departing from the spirit and scope of the invention. For example, although a structure of "human being" is generated under the condition "normal" in the above embodiment, the present invention can be naturally applied to generation of a structure other than "human being".

Next, the structure generating method capable of representing various action patterns of moving objects which are entirely or locally different from one another by using a small amount of data without describing the patterns in different programs.

Figure 18A:
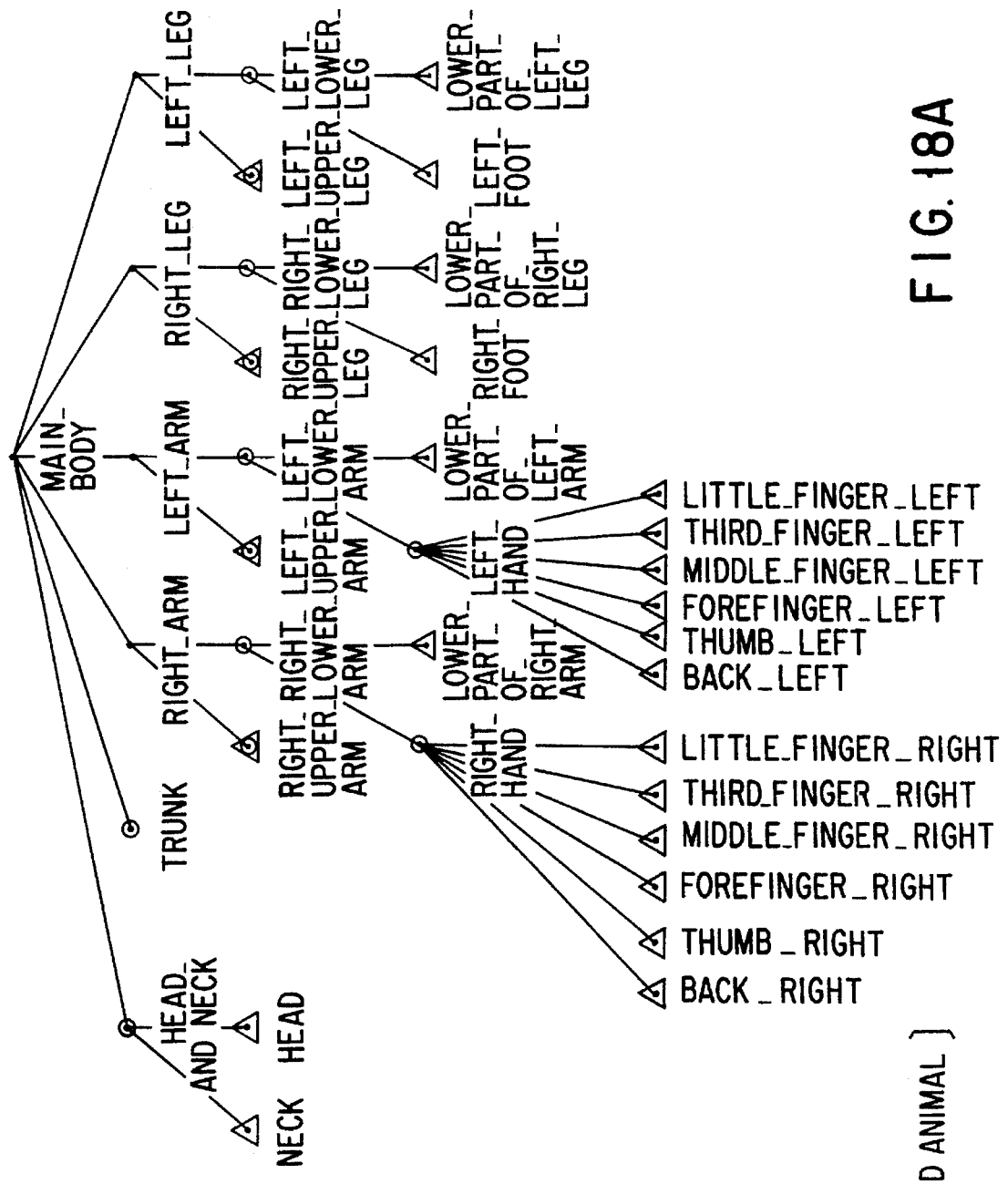

FIGS. 18A and 18B show data structures of certain moving objects. For example, moving objects can be classified from their manners of moving into "biped animal", such as a human being, a robot, and a bear, which moves with two legs and "four-footed animal", such as a dog, a cat, and a horse, which moves with four legs. In addition, constituting components of objects grouped as "biped animal", such as those moving (or linked) like the right arm or the right leg of a human being, can be classified by their names of roles, e.g., "right arm" or "right leg". when a single object is considered as a group of several parts having certain movements, i.e., as a linked structure of components and the movements inside the respective components are classified and subdivided, a tree structure is obtained for the movement. This structure is determined uniquely for each of "biped animal" and "four-footed animal", and the role in the movement or the manner of linking, such as "right arm" or "right leg" described above applies to each node. FIGS. 18A and 18B show the tree structures of "biped animal" and "four-footed animal" and roles given to respective nodes. In the structure shown in FIG. 18A, a main body is present on the first level, and a head, a trunk, right and left arms, and right and left legs are present on the second level. In addition, fingers are arranged as nodes to a right hand of a right lower arm which constitutes the right arm.

Figure 21:
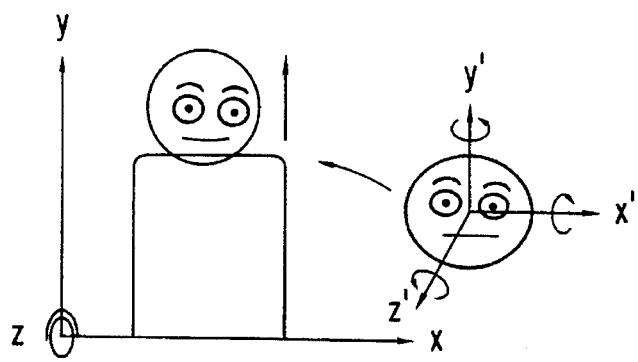
FIG. 21 is a view showing a definition example of the link format data in the roles "head" and "trunk"
Figure 22A:
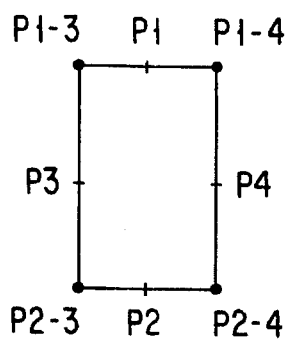
FIGS. 22A through 22E are views showing positional examples of points in units of primitives.
Figure 22B:
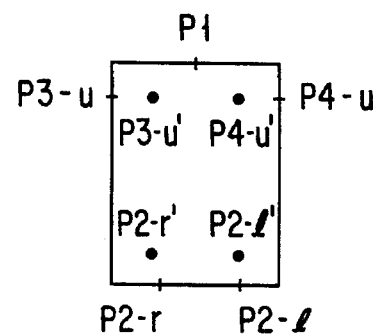
Figure 22C:
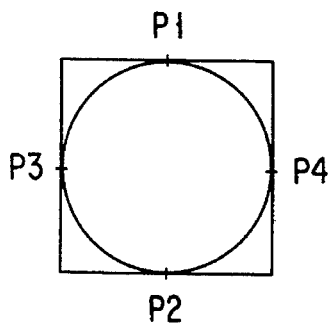
Figure 22D:
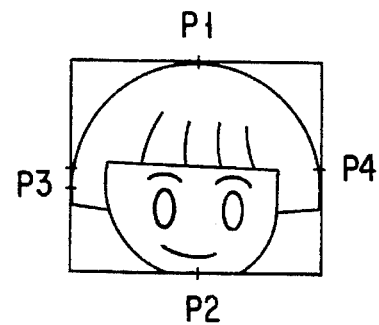
Figure 22E:
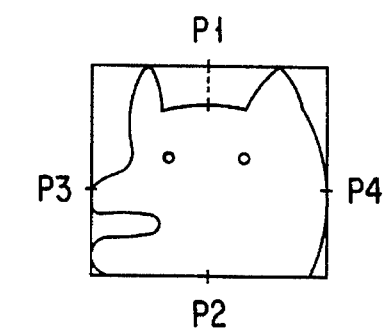

FIG. 19 shows link order data with respect to the roles described in "biped animal" of FIG. 18A, in which a part of static link format data is illustrated. The link order data indicates "which point of which role is linked to which point of which role to result in which role", for example, "point P2 of a head is linked to point P1 of a trunk". FIG. 20 shows link format data with respect to the roles described in "biped animal" of FIG. 18A. The link format data indicates "link to which direction", for example, "when a head is to be linked, the head is directed in a vertical direction". In particular, "direction" is defined by a relative rotational angle about three axes (x,y,z) around a node of a role with respect to another role to be linked therewith. That is, as shown in FIG. 21, in a three-dimensional coordinate space, a head is represented to be linked to a trunk such that it is rotated by 0° about each of the x, y, and z axes. A point in this link position data is described in a form not derived from the shape of a figure, such as P1 or P2. When a role is constituted by a single primitive, a particular primitive such as a rectangular parallelepiped, a sphere, or a face as shown in FIGS. 22A through 22E is calculated as actual numeric data. When a role is constituted by linking several roles, the data is calculated from its descendants. That is, when a head obtained by linking a head portion and a neck is to be linked to a trunk, a node P2 is P2=neck (P2), and the data is calculated from data of P2 of the neck. As a calculating method, points may be newly calculated by considering linked roles as a group.

By using the tree structure shown in FIG. 18A and the link data (link order data and link format data) and arbitrarily cutting nodes of the tree structure, not only a simple shape (e.g., a robot) but also a complicated shape (e.g., a human being) can be represented. For example, when the tree structure of "biped animal" shown in FIG. 18A is cut such that marks (o: level a) serve as leaves and that marks (A: level b) serve as leaves, and is arranged by using a rectangular parallelepiped and a sphere from a list (component example) of primitive figures to be given to a component of each leaf shown in FIG. 23, a large number of objects different in complexity can be represented without having multiple data, as shown in FIGS. 24A and 24B.

Assume that the primitive figure of a component representing a head is to be changed from "sphere" to "dog's head". In this case, since the link order and the link format of the role "head" are set independently of the shape of a primitive serving as a component, for example, "point P2 of a head is linked to point P1 of a trunk", no link data need be added upon replacement of components. That is, "dog's head" itself corresponds to the position of P2 as shown in FIGS. 22A through 22E. Therefore, a shape shown in FIG. 25A can be arranged into a shape shown in FIG. 25B as in the case of "sphere".

Figure 24A:
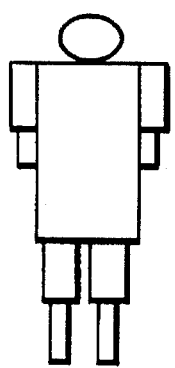
FIGS. 24A and 24B are views showing arrangements of the biped animal in two levels.
Figure 24B:
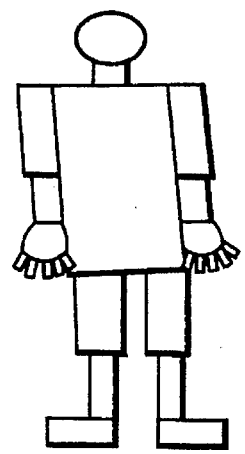
Figure 25A:
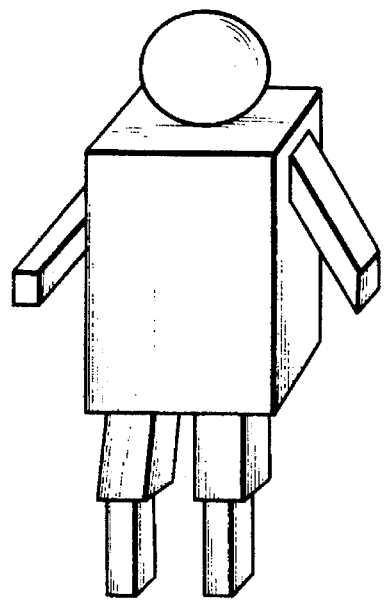
FIGS. 25A and 25B are views showing arrangements of the link format data based on substance names "human being" and "dog"
Figure 25B:
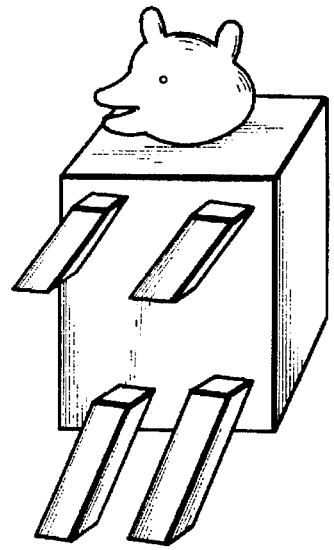

The examples of arrangements shown in FIGS. 24A and 24B are static basic forms created by the tree structure of "biped animal". Examples of arrangements obtained by giving "human being" and "dog" to level A of FIG. 24A from a list (substance name) shown in FIG. 26 to be given to a structure, and examples of deformation in link format data applied in this case will be described. That is, fine adjustment is performed on the basis of deform data shown in FIG. 27 for the basic shape of biped animal (FIG. 20) so that the shape looks more like "human being" or "dog". For example, in the case of "human being", "since arms are linked to slightly face a trunk, a right arm is rotated by −15.0° about the z axis and a left arm is rotated by 15.0° about the z axis". In the case of "dog", on the other hand, "since arms and legs are linked to the front surface side, points to which two arms and two legs are linked are P3u', P4u', P2r', and P21' of a trunk". As a result, "human being" and personified "dog" as shown in FIGS. 25A and 25B are formed.

Figure 29:
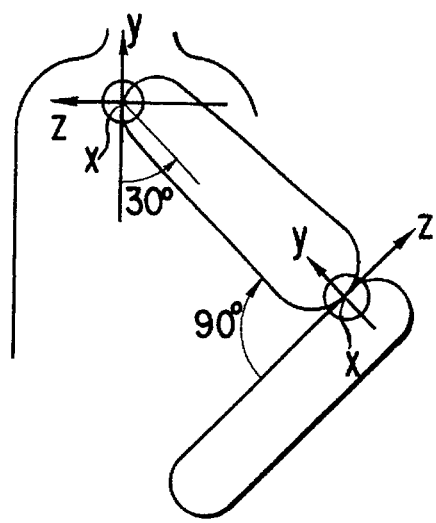
FIG. 29 is a view showing a right arm and a trunk, and a right lower arm and a right upper arm linked by the dynamic link-format data in the action attributes "walk" and "run"
Figure 30:
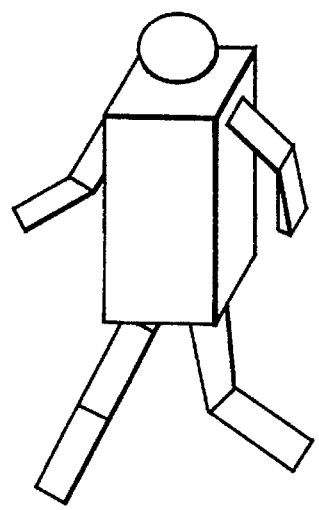
FIG. 30 shows an arrangement when the action attribute "walk" is given to "human being"

FIG. 28 shows an example of active movement data in action attributes "run" and "walk". This data is used to correct "direction" of link format data. The data defines a rotational angle of a pause representing each action attribute and a range of the rotational angle obtained when it changes time-serially, and describes only roles to be corrected. In the action attribute "run", for example, arms are horizontally symmetrically swung back and forth with their elbows bent through right angles. A rotational angle which is changed time-serially within a range set using the pause angle shown in FIG. 28 as an initial value is given as the direction of link format data to these arms. That is, as in the arrangement of the basic shape, a right arm is rotated through 30° about the x axis and linked to a trunk, and a right lower arm is rotated through 90° about the x axis and linked to a right upper arm. As a result, the arm is represented as shown in FIG. 29. More specifically, the action can be represented simply by correcting link data. In addition, by correcting the direction using only a pause angle, a still image of an object which represents its action attribute well can be obtained. FIG. 30 shows an example of representing a human being playing a role of a walker, which is obtained by giving, as a dynamic link format, a pause angle in the action attribute "walk" to the "human being" shown in FIGS. 25A and 25B.

A program can be created on the basis of link data so that components given to the respective leaves of this tree structure maintain the hierarchical structure in accordance with roles.

As described above, the use of link order data and link format data, which are grouped for each classification name (role) constituting one type of a tree structure, and link format data (movement data) for defining an action makes it possible to represent various moving objects different from each other in types of components and levels of tree structures, without preparing different programs for the respective objects. In addition, replacement of components of a moving object once created or deletion of its given local portion can be easily performed. Furthermore, since an action can be locally defined by a rotation of each component about a node, data generation is facilitated.

Figure processing capable of rapidly calculating an image obtained by performing "coloring", "shading", and "shadowing" for an object defined in a three-dimensional space by using a plurality of light sources with modeled illumination characteristics will be described below.

First, a preliminary concept of the present invention will be briefly described. The present invention handles colors in accordance with a processing method in which wavelengths are divided into several wavelength bands as given by the following equation:

$$E=E1, E2 \ldots, EI$$

In commonly used methods, visible light is represented by three wavelength bands "red", "green", and "blue" (I=3: E=Er, Eg, and Eb). However, the present invention is not limited to this method.

Assume that data indicating an amount of each wavelength band contained in light from a light source is "color of light source" ($E=\{E_i\}$: i=1 . . . , I), data indicating a reflection ratio of an object with respect to each wavelength band is "specific color of object" ($R=\{R_i\}$: i=1, . . . I), and data indicating the color of an object having a certain "specific color of object" obtained when light from a light source having a certain "color of light source" is incident on the object is "display color of object" ($C=(C_i)$: i=1, . . . , I). In this case, the ith wavelength band is given as follows:

$$C_i = R_i \times \left( \overset{J}{\Sigma} \alpha_j \times E_{ji} \right)$$

where (j=1, . . . , J: J is the number of light sources),

In this case, $\underline{\alpha}$ is the coefficient indicating the ratio of optical energy transmitted from a certain light source to a certain object. This coefficient is important in calculating "coloring", "shading", and "shadowing" of an object.

Figure 31:
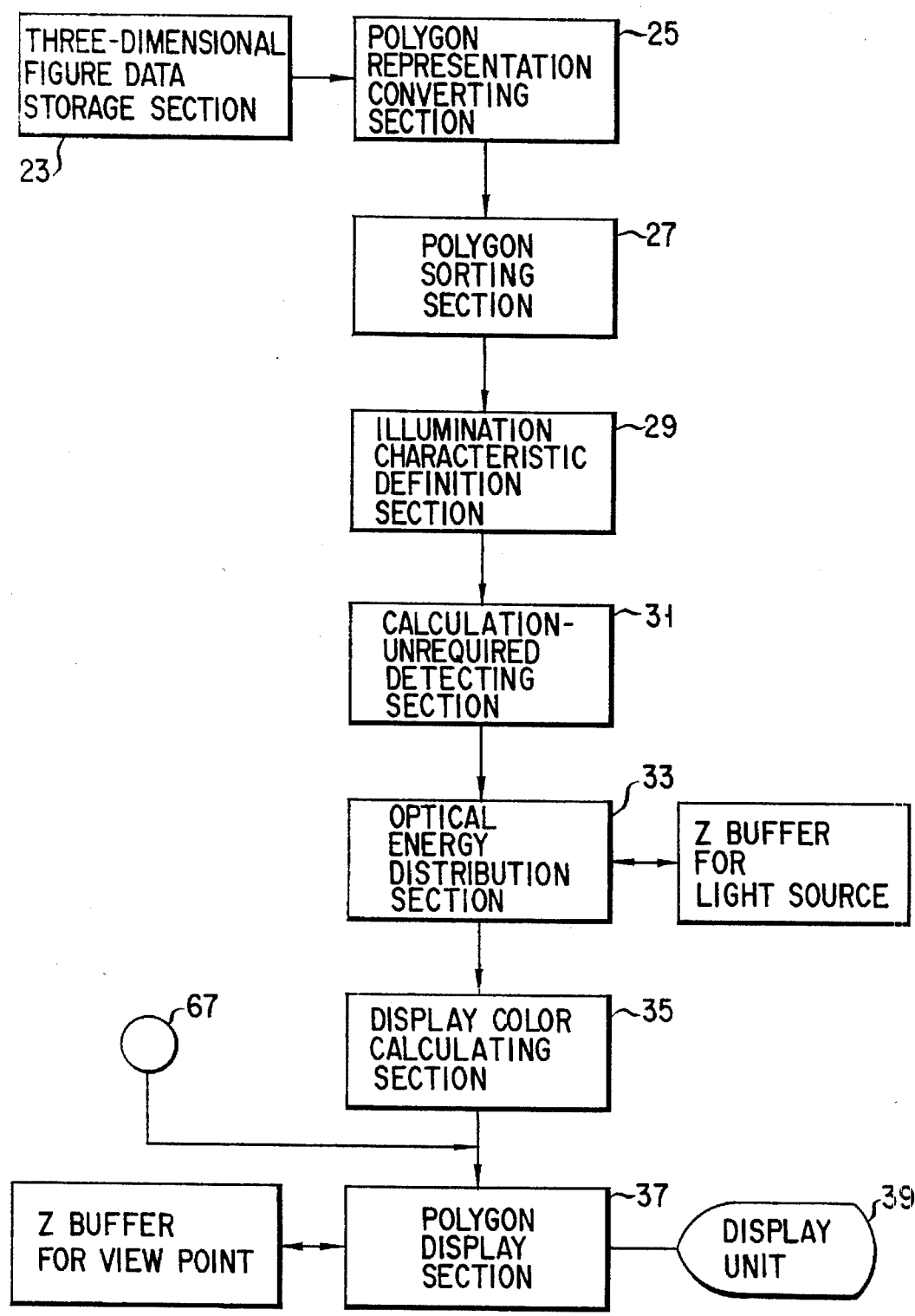
FIG. 31 is a block diagram showing an embodiment of a figure processing apparatus according to the present invention.

FIG. 31 schematically shows the arrangement of an embodiment of a figure processing apparatus incorporated in the presentation support system of the present invention.

In this arrangement, three-dimensional figure data is extracted from a three-dimensional figure data storage section 23 which stores figure data such as the size, the shape, the position, and the specific color of an object or a light source present in a three-dimensional space, and is processed by the respective processing sections to be described below. The processing result is displayed as an image on a display unit 39.

A polygon representation converting section 25 performs polyhedron approximation for an object on the basis of the shape definition of the object stored in a three-dimensional figure data buffer, thereby converting the object into a representation constituted by a plurality of polygons {Pk} (k=1, . . . , N: N is the total number of polygons). For example, a curved surface such as a sphere is divided and processed as a group of polygons. In this case, data of the original curved surface is assigned to these polygons and used upon display. Also in the case of an object constituted by flat surfaces, such as a rectangular parallelepiped, these flat surfaces are divided if necessary.

Figure 32:
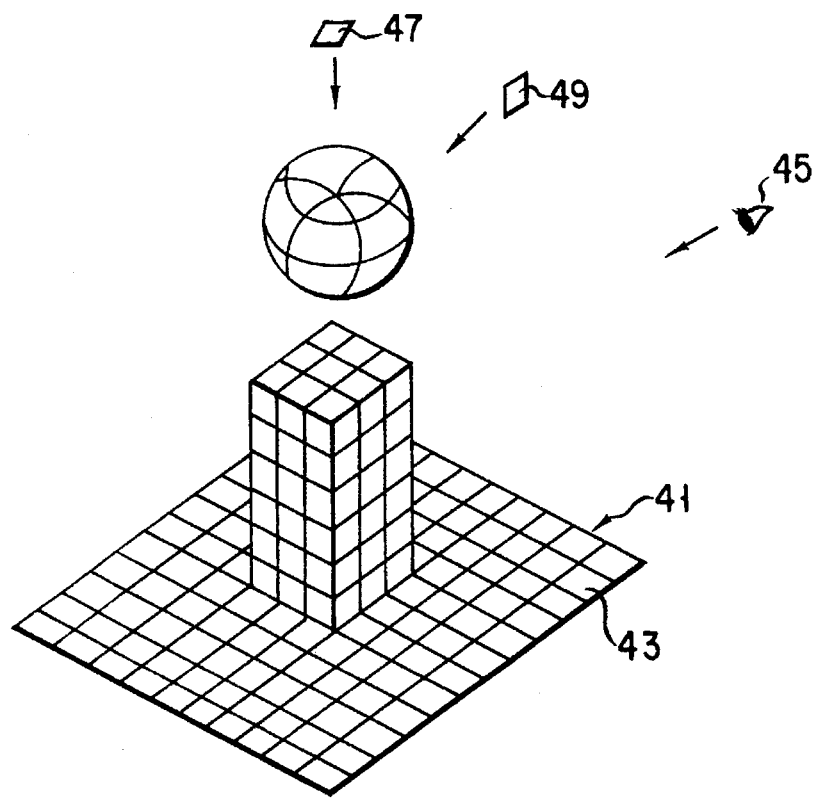
FIG. 32 is a view showing a three dimensional space to be processed by the embodiment shown in FIG. 31.

FIG. 32 shows an example of this case. A large rectangular parallelepiped 41, for example, is converted into a representation constituted by a plurality of polygons. Each polygon 43 is used as a calculation unit in the subsequent processing. Referring to FIG. 32, reference numeral 45 denotes a view point; and 47 and 49, light source polygons.

Data of each polygon must include at least the size of the polygon, the vertex coordinates of the polygon, the normal vectors at the vertexes, and the "reflectance in each quantized frequency band of light" which is data indicating the specific color of the polygon.

Methods of dividing an object into polygons are as follows.

(1) Each object is divided into polygons having substantially equal sizes.

(2) Polygons closer to a view point are divided more finely.

(3) Polygons closer to light sources are divided more finely.

(4) Adjacent polygons having a large brightness difference between them are divided more finely.

(5) Polygons designated by a user are divided more finely.

The polygon representation converting section 25 can either adopt one of the methods (1) through (5) above or select a combination or one of the methods (1) through (5), which has the largest effect, in accordance with an evaluation function based on, e.g., the fineness of a shadow to be drawn or a drawing time. FIG. 32 shows an example in which an object is divided into polygons in accordance with the method (1).

A polygon sorting section 27 sorts the polygons {Pk} (k=1 . . . , N) into light-source polygons {Lj} (j=1, . . . , J) which emit light and have brightness and non-light-source polygons {Dk} (k=1, . . . , N-J) which can have brightness when irradiated with light from the light-source polygons. Sorting means in this case are as follows.

(1) Determination is performed directly by referring to the object attribute of three-dimensional object data.

(2) When a light-source three-dimensional object is divided into polygons, some adjacent polygons are sorted as non-light-source polygons. That is, the number of light-source polygons is decreased in order to increase the calculation speed.

(3) Polygons designated by a user are sorted as light-source polygons or non-light-source polygons.

The polygon sorting section 27 selects a combination or one of the means (1) through (3) above.

An illumination characteristic definition section 29 for light-source polygons defines illumination characteristics such as the brightness, the color, and the manner of spread of light of each light source, and assigns the defined characteristics to light-source polygons. An example of a method for this purpose is a definition method for a light source having directivity, such as a spotlight. This method will be described below with reference to FIGS. 33 through 35.

Figure 33:
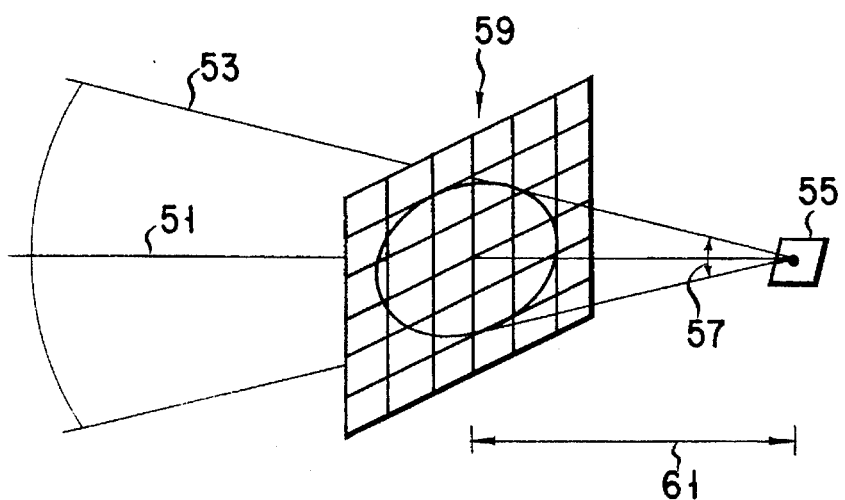
FIG. 33 is a view for explaining illumination characteristics of a light source.
Figure 34:
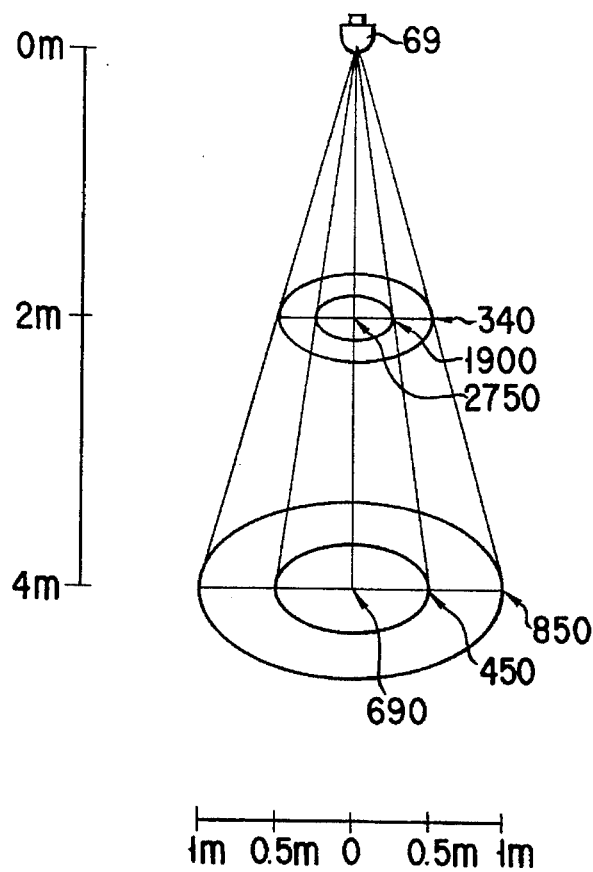
FIG. 34 is a view showing an example of illumination characteristics of a spot light.

Referring to FIG. 33, the illumination characteristics of a real spotlight are represented by the color of light, the brightness at a given distance in a main direction 51 of illumination, and the brightness which decays as the position is separated from the main direction 51 of brightness. In the case of the spotlight, the radiation amount of light outside a given range is negligibly small. This conical range is called a "light beam" 53. Referring to FIG. 33, reference numeral 55 denotes a light-source polygon; and 57, a view field angle. FIG. 34 shows a white spotlight obtained by a light source 69 with 100 V and 150 W.

In this embodiment, the above illumination characteristics are defined by an optical energy amount of each wavelength band of a light source and a "weighting arrangement" 59 which represents an illumination distribution of the section of the "light beam" 53.

Figure 35:
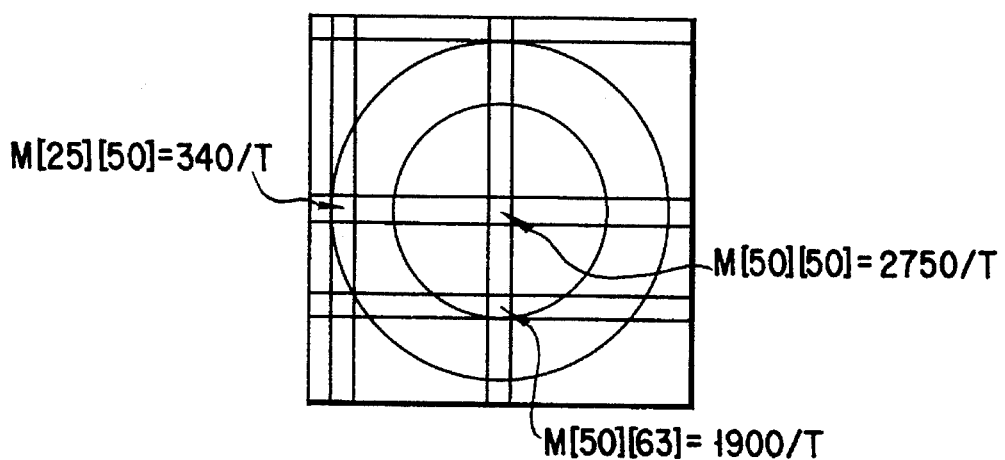
FIG. 35 is an example of a weighting arrangement.

In this case, a two-dimensional weighting arrangement $M_j$ of a light-source polygon $L_j$ is placed at a position located before and separated by a projection distance 61 from the light-source polygon 55, and an individual element $M_j[x][y]$ (x=1 . . . , X: y=1, . . . , Y: X and Y represent the size of the arrangement) indicates the ratio of the quantity of optical energy passing through the element. FIG. 35 shows an example of the weighting arrangement $M_j$. FIG. 35 shows a weighting arrangement of M[100][100] at a projection distance of 2 m. Note that reference symbol T in FIG. 35 denotes a constant value for normalizing M.

If illumination data at several positions are given, interpolation is performed on the basis of the data to determine the values of all elements. If an illumination distribution is given as a function, the values are determined in accordance with this function. This weighting arrangement shows the radiation amount of optical energy depending on an angle from the light source and stores an illumination distribution on the section of a light beam from the light source in the form of a two-dimensional arrangement. Therefore, an element including the main direction 51 of illumination has a maximum value, and an element outside the light beam 53 has 0.

The projection distance 61 is calculated as a distance within which the light beam does not deviate from the weighting arrangement 59. A light source having a sharp conical light beam, such as a pin spotlight, can be represented by increasing the projection distance.

If the shape of a light beam is symmetrical, the weighting arrangement 59 can be represented as a small arrangement by omitting the symmetrical portion.

The use of the weighting arrangement 59 makes it possible to represent a light beam to be defined, which has an arbitrary shape other than a cone, because an illumination distribution on the section of the light beam can be stored in the weighting arrangement.

In the case of a light source, such as a spotlight, whose light radiation is limited in the front direction, a light beam is represented by a single weighting arrangement on a two-dimensional flat plane. In the case of a light source whose light radiation is not limited in the front direction, weighting arrangements corresponding to the respective directions are used to surround the entire section of a light beam, thereby representing the shape and the weighting of the light beam.

Note that the illumination characteristic definition section 29 is defined for each light-source polygon {Lj}. If the light-source polygons 55 have common illumination characteristics, the data area and the data definition time can be saved by sharing the data.

An optical energy distribution section 33 distributes optical energy from each light-source polygon {Lj} to the non-light-source polygons {Dk} by using the weighting arrangement. This distribution will be described below with reference to FIGS. 32, 35, and 36.

Figure 36:
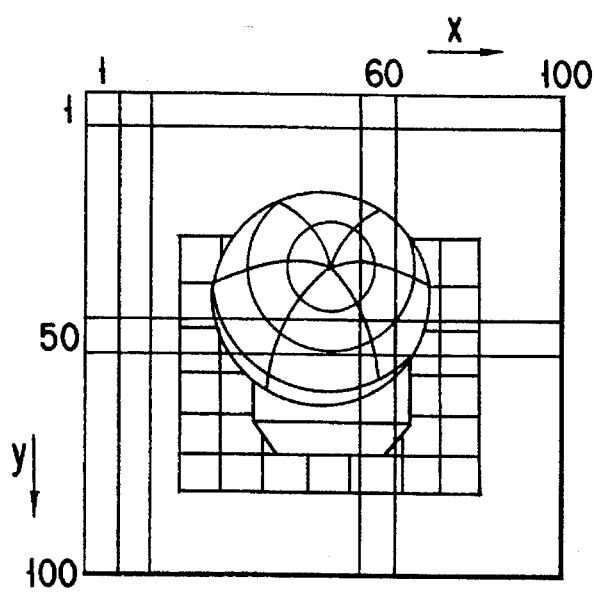
FIG. 36 is a view showing a polygon number image obtained according to a Z-buffer method from the light source.

First, a Z buffer method from the light-source polygon Lj is performed. In this case, the center of the light-source polygon 47 shown in FIG. 32 is used as a view point, and the Z buffer method is applied to polygons except for this polygon by using a light-source Z buffer 63, thereby calculating a perspective projection image in a three-dimensional space viewed from the light source. FIG. 36 shows a two-dimensional image Wj obtained by this processing. A view field angle upon perspective projection performed by this calculation is set equal to the view field angle 57 of the weighting arrangement Mj of this light-source polygon.

The element $Wj[x][y]$ ($x=1 \ldots , X: y=1 \ldots , Y$: X and Y represent the size of an image) of the two-dimensional image wj thus produced has the number of a polygon $\underline{p}$ shown at that element position [x][y] as its data, unlike in the case of an image produced by a normal Z buffer method.

$$Wj[x][y]=p$$

For example, the number of one of polygons constituting a sphere is written in Wj[60][50] of FIG. 36. Therefore, the image WJ shown in FIG. 36 is called a polygon number image Wj of the light-source polygon Lj.

In this embodiment, the size of the wj arrangement is equal to that of the corresponding weighting arrangement Mj. However, the present invention is not limited to the above embodiment.

The polygon number image Wj (FIG. 36) includes only polygons which can be seen from the light-source polygon 47, i.e., polygons which can receive optical energy from the light-source polygon 47. Polygons remote from the light source are projected to be small and therefore share a small portion in the polygon number image Wj. This means a physical property that a polygon farther from the light source receives a smaller amount of optical energy from the light source than that received by a polygon closer to the light source.

Distribution to non-light-source polygons is then performed. If a polygon indicated by each element wj[x][y] of the polygon number image wj from the light-source polygon LJ is a non-light-source polygon Dk, a portion ΔE (Equation 1) of optical energy (Ej={Eji}: i=1 ..., I: I is the number of wavelength bands) of the light-source polygon Lj is given to a non-light-source polygon (Equation 2) indicated by the element Wj[x][y] for each of the wavelengths in accordance with the distribution value of the corresponding element Mj[x][y] in the weighting arrangement Mj of the light-source polygon Lj.

Each non-light-source polygon Dk converts the energy ΔE given to it into a value per unit area for each wavelength band, and integrates and records the values (Equation 3).

$$\Delta Ei = Mj[x][y] \times Eji \qquad \text{(Eq. 1)}$$

$$Dk = Wj[x][y] \qquad \text{(Eq. 2)}$$

$$Dk.Ei = Dk.Ei + {}^2Ei/Dk.area \qquad \text{(Eq. 3)}$$

(i=1 ..., I: I is the number of wavelength bands)
(Dk. Ei is the optical energy of the ith wavelength band given to the non-light-source polygon Dk)
(Dk.area is the area of the non-light-source polygon Dk)

The optical energy distribution 33 performs this distribution of optical energy for each of the light-source polygons {Lj}.

The processing of this optical energy distribution section 33 largely consumes a calculation cost. For this reason, a calculation-unrequired polygon detecting section 31 for detecting a polygon not requiring a calculation is provided before the optical energy distribution section 33. The contents and the necessary conditions of processing of the calculation-unrequired polygon detecting section 31 will be described later.

A display color calculating section 35 for non-light-source polygons determines a display color from the given optical energy. Each non-light-source polygon Dk multiplies the optical energy (Dk.Ei) for each wavelength band given to it by its specific color, i.e., a reflection coefficient (Dk.Ri) for each wavelength band in units of wavelength bands, thereby converting the color into a color which can be displayed by the display unit 39.

$$Dk.Ci = Dk.Ri \times Dk.Ei$$

(i=1, ... I: I is the number of wavelength bands)
(Dk.Ci is the display color corresponding to the ith wavelength band of the non-light-source polygon Dk)

This processing is performed for all of the non-light-source polygons {Dk}. The result is an average display color of the non-light-source polygons. Subsequently, an average display color of adjacent polygons which share a certain vertex of each non-light-source polygon is calculated for all vertexes of the polygon, thereby obtaining a display color at each vertex required for display.

The display color of the light-source-polygon {Lj} is converted into a color which can be displayed on the display unit 39 in accordance with the ratio of optical energy {Eji} in units of wavelengths.

In this manner, the positions and display colors of vertexes of all of the polygons Pk are obtained.

Figure 37:
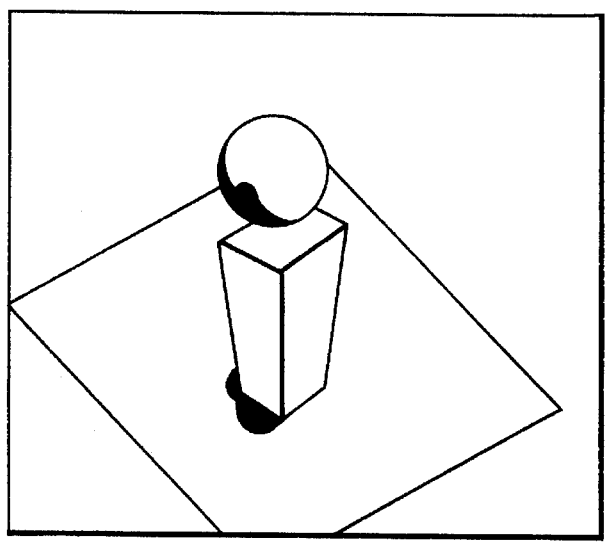
FIG. 37 is a view showing an image depicted according to the Z-buffer method from a view point, which is finally obtained.

A polygon display section 37 performs coordinate conversion to a view point coordinate system and perspective conversion from the visual point for the vertex data of all the polygons Pk thus calculated. The polygon display section 37 removes shaded surfaces by using a Z buffer 65 for a view point and displays the image on the display unit 39. FIG. 37 shows a display example on the display unit 39.

In incorporating the above processing in an interactive system, not all of the processing need be executed again depending on the contents of a change designated by a user. As a result, an image can be updated at a higher speed.

The conditions for this advantage are as follows.

(i) When a user designates only a change in position of a view point, an image is updated simply by performing the processing again from a processing position 67 shown in FIG. 31.

(ii) When a user designates a change in illumination characteristics of light sources, the processing of the illumination characteristic definition section 29 is performed only for the changed light sources, and the processing is restarted from the calculation-unrequired polygon detecting section 31 or the optical energy distribution section 33.

(iii) When a user designates a change in illumination characteristics of light sources and the position of a view point is not changed, the processing of the illumination characteristic definition section 29 is performed only for the changed light sources, and the processing is restarted from the calculation-unrequired polygon detecting section 31 or the optical energy distribution section 33 while the coordinate conversion calculation to a view point coordinate system in the polygon display section 37 is omitted.

The calculation-unrequired polygon detecting section 31 will be described below.

This calculation-unrequired polygon detecting section 31 adopts a combination of methods to be described below, and usable methods change in accordance with the limitations of the system. That is, a method to be used is determined by a system or a user by comparing a time required for executing this detecting method with a processing time in the distribution section saved by the method.

(a) Detection of polygons which are covered with other polygons in contact with these polygons and therefore can never be seen from a view point or light sources. As an example, if overlapped rectangular parallelepipeds are present, polygons present on contacting surfaces are detected.

(b) Detection of polygons which are surrounded by other polygons and therefore can never be seen from a view point. Assume, for example, that a sphere is present in a rectangular parallelepiped. In this case, if a view point is present outside the rectangular parallelepiped, the sphere cannot be seen from the view point. As another example, if a view point is present in a given closed space, all objects outside this closed space cannot be seen from the view point.

(c) Detection of polygons which are surrounded by other polygons and therefore never irradiated with light from light sources. This processing is performed by applying the method (b) above to the light sources.

(d) Detection of polygons, between which and a view point other polygons are always present and therefore which can never be seen from the view point.

(e) Detection of polygons, between which and light sources other polygons are always present and therefore which are never irradiated with light from the light sources.

(f) Detection of polygons always present outside a view field and not present between polygons which can be seen from a view point and light sources.

(g) Detection of polygons always present outside light beams from light sources.

(h) Detection of polygons designated to be calculation-unrequired polygons by a user.

If the position of a view point is not limited, the methods (b) and (d) cannot be used. If the position of a light source is not limited, the methods (c) and (e) cannot be applied to that light source.

In the calculation of the optical energy distribution section 33, polygons detected by these methods are not processed in the distribution calculations for the respective corresponding light sources or in the distribution calculations for all of the light sources. In addition, polygons determined not to be displayed are not processed even in the calculating section 35 for a display color and the display section 37. As a result, it is possible to reduce the calculation cost.

The presentation support system which can easily and effectively form materials for presentation based on various collected data and can effectively add background data such as images or sounds to the presentation materials will be described below.

Note that the system will be explained by taking a case in which, in business presentation, a bar chart or a line graph is formed in accordance with the contents of collected data as an object to be presented and an image which assists audience to interpret the chart or graph is synthesized and displayed as its object (background data), as an example.

FIG. 38 schematically shows the arrangement of the entire system according to this embodiment, in which reference numeral 71 denotes an input section. Data indicating the contents of an object to be presented, such as item names, numeric data for each item, units, and the title of a graph, are input via this input section 71. In addition, data indicating the intention of presentation, such as item names of a presentation material to be displayed in the form of a graph, numeric data, and a part of a title, are also input via the input section 71.

A storage section 73 stores the content data concerning an object to be presented and the data indicating the intention of presentation, which are input from the input section 71 as described above, and also stores the result of analysis performed by a character string analyzing section 75 (to be described later). This character string analyzing section 75 refers to a word dictionary 75a to extract nouns from a character string of item names or a title stored in the storage section 73, and stores them in the storage section 73.

An analyze dictionary 77 includes a proper noun dictionary 77a, a concept dictionary 77b, and a numeric attribute name dictionary 77c. The proper noun dictionary 77a stores proper nouns of the nouns extracted by the character string analyzing section 75 in correspondence with categories to which these proper nouns belong, as shown in FIG. 39. The concept dictionary 77b describes the properties of the categories, which are stored in the proper noun dictionary 77a, in the form of their attributes and the corresponding values, as shown in FIGS. 40A through 40C. The numeric attribute name dictionary 77c stores, for example, a word representing a numeric attribute, such as a sales or a producing number, in correspondence with a numeric attribute name in the attribute names indicated in the concept dictionary 77b, as shown in FIG. 41. This system is also equipped with an interference rule dictionary 79. As shown in FIGS. 42A and 42B, for example, this inference rule dictionary 79 stores inference rules indicating the causal relations described by state representations obtained by the categories or the attribute names of the categories described in the concept dictionary 77b, the numeric attribute names, and changes in the numeric attributes.

An analyzing section 81 retrieves the proper noun dictionary 77a, the concept dictionary 77b, and the numeric attribute name dictionary 77c for the words stored in the storage section 73 and extracted by the character string analyzing section 75. The analyzing section 81 extracts a category name and the attribute name of that category, a numeric attribute name, and time data such as a year, which are required to make matching with the inference rules stored in the inference rule dictionary 79, by using keywords such as [year][month]. The category name and the attribute name of that category, the numeric attribute name, the time data, and the like extracted by the analyzing section 81 are stored in a parameter storage section 83.

An inference analyzing section 85 extracts an interference rule matching with the category name and the attribute name of that category and the numeric attribute name stored in the parameter storage section 83 as described above, i.e., an inference rule including the category name and the attribute name of that category and the numeric attribute name from the inference rule dictionary 79. The inference analyzing section 85 checks the change state of the numeric attribute in the extracted inference rule by performing a calculation using the attribute value stored in the storage section 73 or by performing an interaction with a user, thereby carrying on the inference processing. In this inference processing, a keyword representing the background of an object to be presented is extracted. The keyword extracted by the inference analyzing section 85 is stored in a keyword storage section 87.

An image data base 97 stores various image data for supporting presentation, each of which is indexed with a keyword for specifying a state in which that image data is to be displayed. This keyword is preset as index data with respect to the image data.

An image selecting section 89 retrieves the image data base 97 in accordance with a keyword stored in the keyword storage section 87 and selects image data suited to the keyword from various image data for representing the background (background environment) of presentation, as a background image for use in presentation. The image thus selectively retrieved and extracted from the image data base 97 is supplied to a display section 91, and data associated with this image is supplied to a display control section 93.

Note that a converting section 95 forms a graph representing content data about an object to be presented, such as item names, numeric data for each item, units, and the title of the graph, which are stored in the storage section 73, on the basis of that content data or by arbitrarily performing an interaction with a user, if necessary. In the formation of this graph, data indicating the type of the graph, such as a bar chart or a line graph, data for specifying the maximum and minimum values in the graph, data for designating a scale interval, and the like are given as a conversion rule. In accordance with such a conversion rule, the converting section 95 converts the content data (e.g., numeric data in units of items) as an object to be presented, which is indicated by the input data, into a graph.

The display control section 93 combines the graph produced by the converting section 95 with the image data selected by the image selecting section 89 and obtained from the image data base 97 by controlling, e.g., their sizes and positions, thereby forming a presentation material as a synthesized picture. This image (presentation material) synthesized by the display control section 93 is displayed via the display section 91 such as a CRT display or an overhead projector display.

The processing operation of the system of the present invention having the above arrangement will be described below.

Figure 43A:
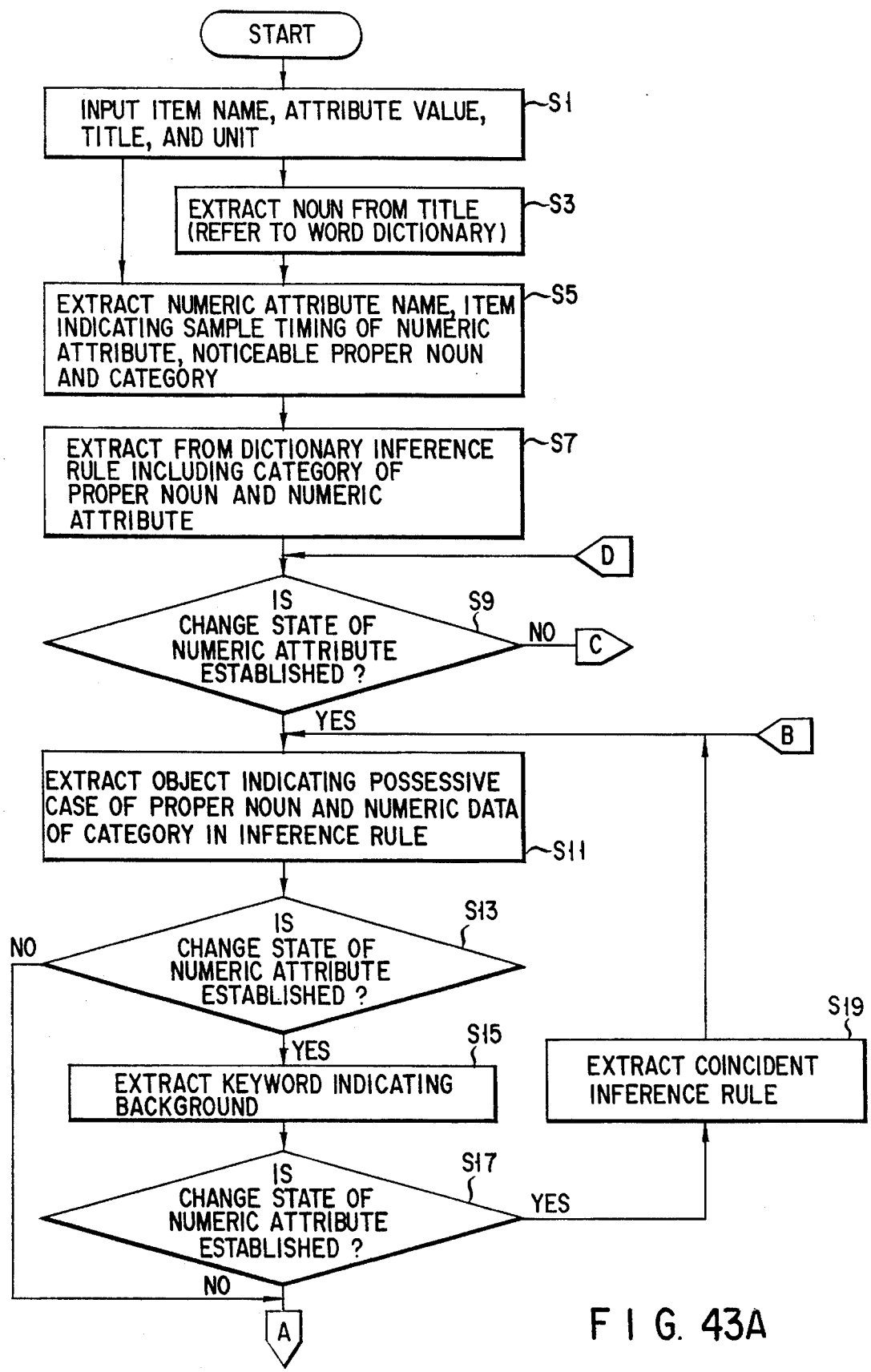
FIGS. 43A and 43B are flowcharts showing an operation of the embodiment shown in FIG. 38.
Figure 43B:
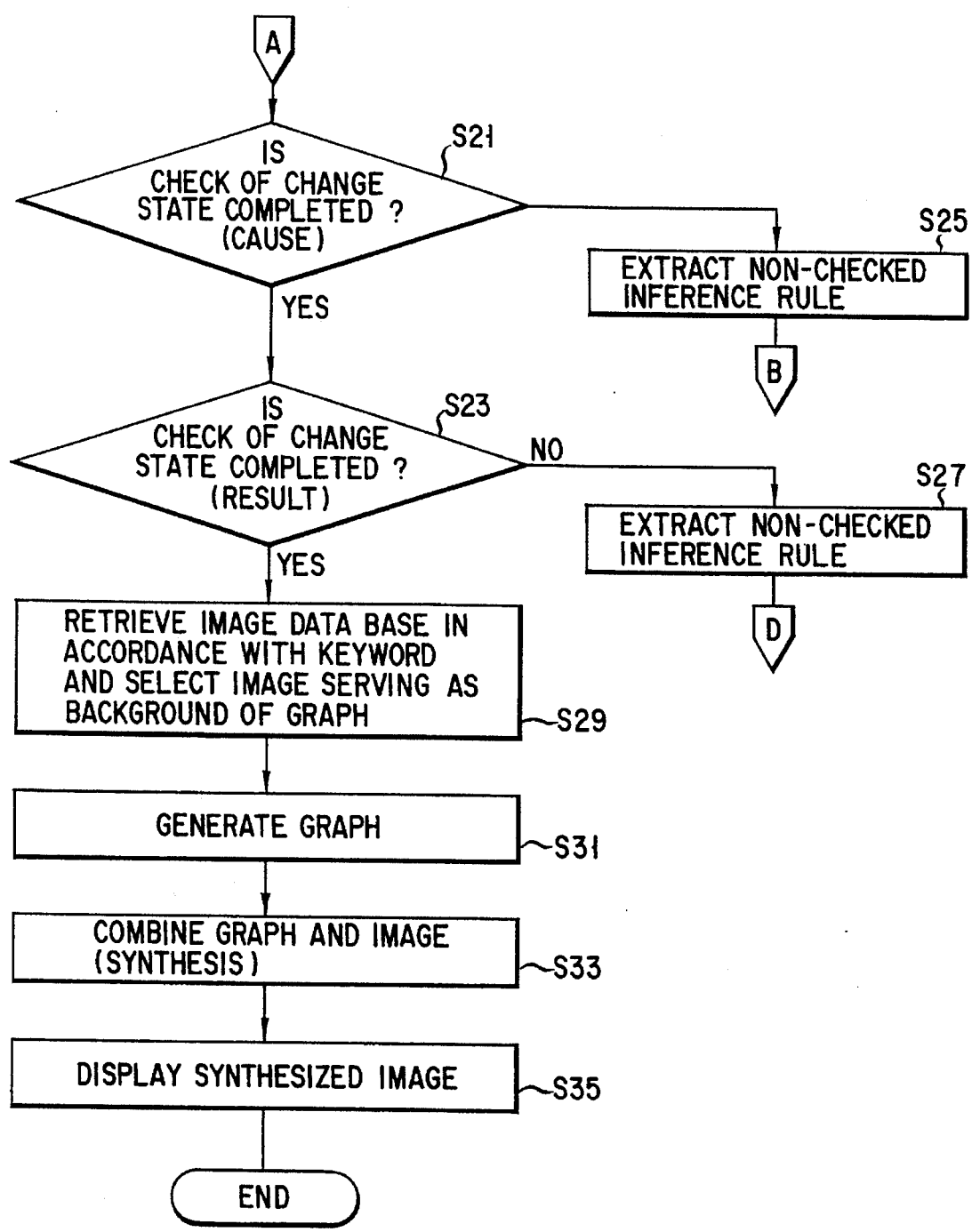
Figure 49A:
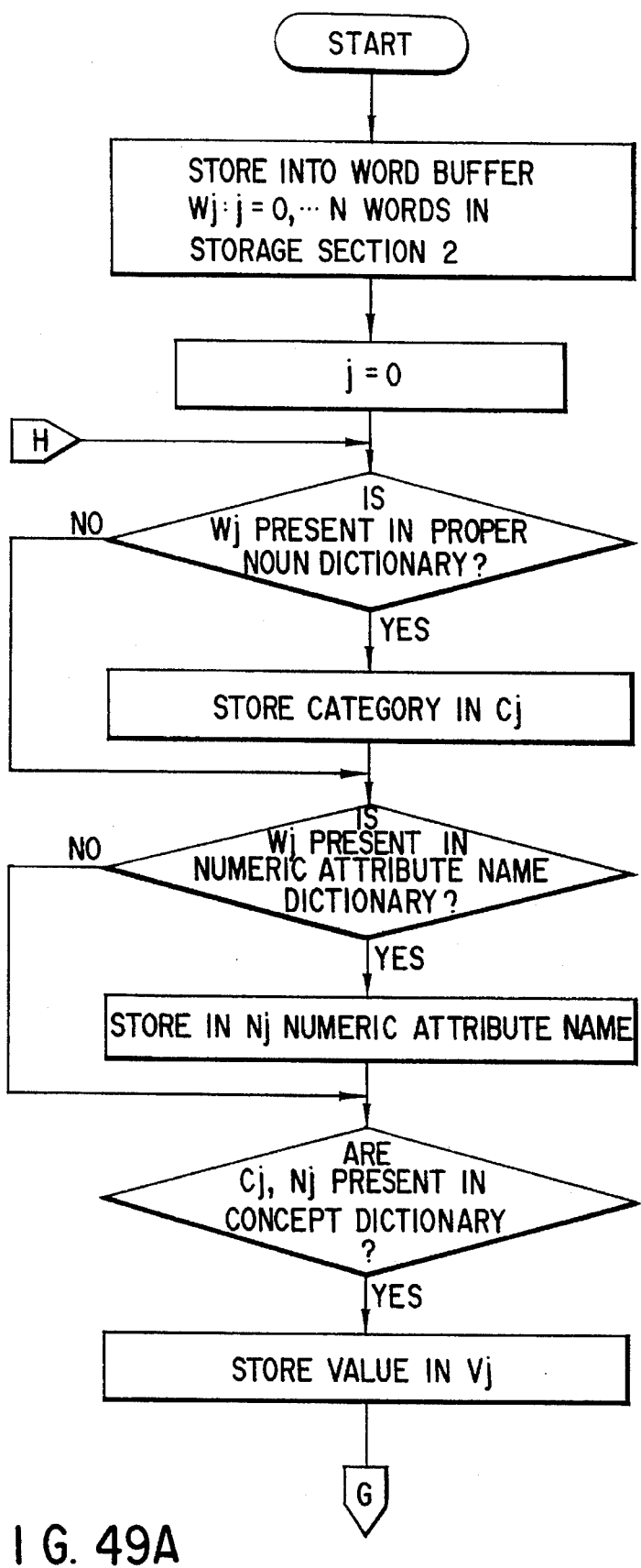
FIGS. 49A and 49B are flowcharts showing details of an analyzing section shown in FIG. 38.
Figure 49B:
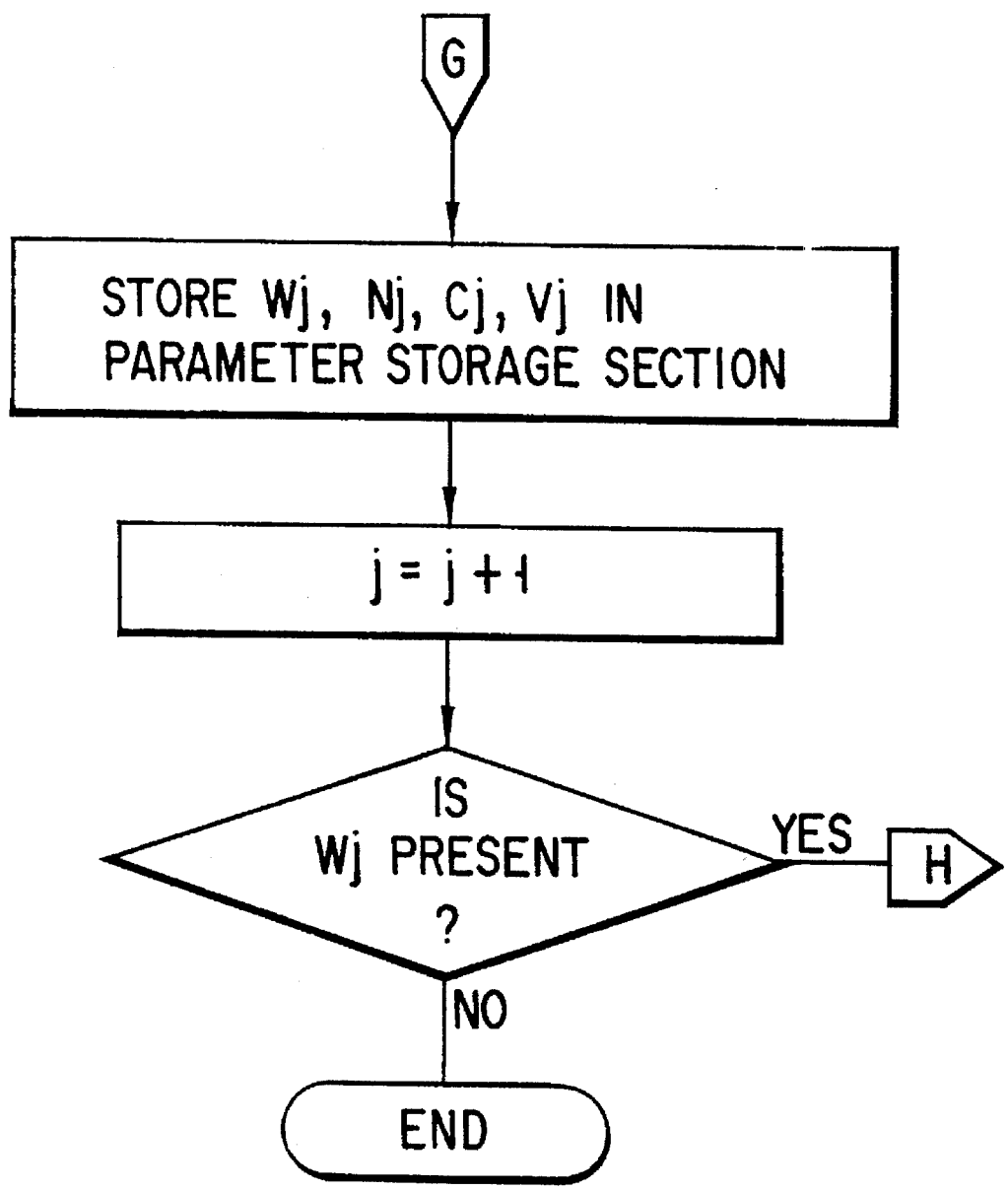

FIGS. 43A and 43B schematically show the flow of the processing operation of this system. First, content data about an object to be presented is input as, e.g., item names, numerals, units, and a title from the input section 71, and this input data is stored as two-dimensional data (in the form of a table) as shown in FIG. 44 or 45 in the storage section 73 (step S1). That is, the item names and the attribute values as the input data are sorted in units of items constituting a two-dimensional arrangement and stored in the storage section 73.

For example, input data as shown in FIG. 45 is stored as data of the two-dimensional arrangement below:
Numeric item (1, 2)=1971,
Numeric item (1, 3)=1972,
Numeric item (1, 4)=1973,
Numeric item (1, 5)=1974,
Numeric item (2, 1)=company A
Numeric item (2, 2)=100,
Numeric item (2, 3)=120,
Numeric item (4, 4)=110,
Numeric item (4, 5)=110

The character string analyzing section 75 is then activated to perform matching processing for the title in the input data stored in the storage section 73 by using the word dictionary 75a and extracts only nouns from the title by cutting words. These words (nouns) extracted from the title by the character string analyzing section 75 are stored in the form of, e.g., a one-dimensional arrangement in the storage section 73. More specifically, words (nouns) are extracted from data "sales amount of large companies A, B, and C" input as title data and stored as the one-dimensional arrangement data below (step S3):
Title (1)=company, Title (2)=company A,
Title (3)=company B, Title (4)=company C,
Title (5)=sales The input data such as the item names, the attribute values, and the title thus stored in the storage section 73 is displayed on the display section 91 as data in the form of a table as shown in FIG. 45. In this case, half-tone dot meshing using oblique lines, for example, is performed for the nouns in the title or the item names and the attribute values to discriminate them from the other words.

This discrimination of nouns in the title, item names, and attribute values is performed to urge a user to input items to be noted in presentation, i.e., to input user data for clarifying the intention of presentation. Of the item names, the attribute values, and the title which are marked with oblique lines, a user selectively designates an item assumed to be important in performing presentation from the input section 1.

If the selectively designated item is an attribute value, the input section 71 extracts item names of a row and a column, in which the designated attribute value is described, from the storage section 73, and stores them as selective items in the storage section 73. If a user selectively designates an item name or a noun in the title, this designated item is stored as a user-designated selective item in the storage section 73.

For example, if attribute value [170] is selectively designated in FIG. 45, numeric item (3, 1) for "company B" in that row and numeric item (1, 3) for [1972] in that column are extracted and stored as selective items. If item name [1973] is selectively designated, numeric item (1, 4) of this [1973] is extracted and stored as a selective item. If [company A] is selectively designated from the title, title (2) of [company A] is extracted and stored as a selective item.

Thereafter, the analyzing section 81 retrieves the numeric attribute name dictionary 77c as shown in FIG. 41 for the selective item stored in the storage section 73 as described above and checks whether the selective item is an attribute value given by numerals such as [sales] or [producing number]. If the selective item is a numeric attribute name, the analyzing section 81 refers to the concept dictionary 77b as shown in FIGS. 40A through 40C to extract a numeric attribute name such as [sales] or [producing number] corresponding to the attribute name such as [sales] or [producing number], and stores the extracted numeric attribute name in the parameter storage section 83 (step S5). In this processing, the numeric attribute name [producing number] is stored in the parameter storage section 83 with respect to an item representing the number of products such as [producing number], [manufacturing number], or [yielding number].

If, however, no selective item is registered in the numeric attribute name dictionary 77c, similar processing is performed for nouns of all titles and item names stored in the storage section 73. A numeric attribute name retrieved in this processing is stored in the parameter storage section 83. If a plurality of numeric attribute names are retrieved, nouns in a title or item names, from which these numeric attribute names are derived, are displayed on the display section 91, and a user designates one of them. A numeric attribute name corresponding to the designated noun in the title or item name is extracted from the concept dictionary 77b and stored in the parameter storage section 83.

If no numeric attribute name is retrieved, a message "analysis impossible" is displayed on the display section 91, and the processing is ended.

For example, when attribute value [170] is designated by a user in FIG. 45, two item names [company B] and [1972] are extracted as selective items from the corresponding row and column, respectively. These item names [company B] and [1972] are not registered in the numeric attribute name dictionary 77c since they have no attribute representing numerals. In this case, therefore, [company A], [company B], [company C], [1971], [1972], and [1973] are obtained from the item names stored in the storage section 73, and [company], [company A], [company B], [company C], and [sales] are extracted from the nouns in the title stored in it. For these item names, the numeric attribute name dictionary 77c is retrieved. Since only the item name [sales] having a numeric attribute is registered in the numeric attribute name dictionary 77c in correspondence with these item names, the attribute name [sales] representing [service, gross sales of products] in the concept dictionary 77b is retrieved from the numeric attribute name dictionary 77c and stored in the parameter storage section 83.

The analyzing section 81 then checks whether each selective item stored in the storage section 73 includes a keyword representing time, such as [year], [month], [Showa era], or [Heisei era], at its leading or trailing end. If a selective item including characters representing time is found, this selective item is stored as an index item in the parameter storage section 83. More specifically, the index item represents a time series such as [1972], [1980], or [10 o'clock].

When the selective item does not correspond to the above keyword representing time, similar processing is performed for all item names and nouns in titles stored in the storage section 73. If a word including characters representing time at its leading or trailing end is found from these item names and nouns in a title, this word is stored as the index item in the parameter storage section 83. If a plurality of selective items including data representing time are detected, a user designates one of the items as an item to be noted. This user-designated item is stored as the index item in the parameter storage section 83.

If no item including characters representing time is found in nouns in a title, a user inputs time series data. For example, a screen as shown in FIG. 44 is displayed on the display section 91. If the user selectively designates [sales], this [sales] designated as the selective item cannot be the index item described above because it does not include characters representing time. Therefore, it is checked whether any of item names [black pencil], [red pencil], [blue pencil], [price], [sales], and [production cost] and nouns [pencil], [sales], [amount], and [1985, year] in the title stored in the storage section 73 has a keyword representing time. In this case, it is found that a noun [1985, year] in the title includes characters representing time at the end. Therefore, this item [1985, year] is stored as the index item in the parameter storage section 73.

After the index item is obtained in this manner, the analyzing section 81 retrieves the proper noun dictionary 77a in accordance with the selective item stored in the storage section 73. If the selective item is registered in the proper noun dictionary 77a, the analyzing section 81 extracts that selective item from the proper noun dictionary 77a and stores the category and the item name as a presentation category and a presentation item in the parameter storage section 83.

If the selective item is not registered in the proper noun dictionary 77a, the analyzing section 81 retrieves the proper noun dictionary 77a for all of the item names and the title items stored in the storage section 73, and discriminates nouns in the items and the title registered in the proper noun dictionary 77a from other words on the display screen. The analyzing section 81 stores one of the discriminated nouns in the item names and the title, which is selectively designated to be important in presentation by a user, as a presentation item in the parameter storage section 83. At the same time, the analyzing section 81 retrieves the proper noun dictionary 77a to find a category of the above presentation item and stores the found category as a presentation category in the parameter storage section 83.

After the presentation category and the presentation item obtained as described above are stored in the parameter storage section 83, the inference analyzing section 85 is activated.

The inference analyzing section 85 retrieves the inference rule dictionary 79 to find an inference rule including the contents (the item name, the nouns in the title, the category, and the numeric attribute name) stored in the parameter storage section 83 as a cause or an effect (step S7). The inference analyzing section 85 refers to a portion of the effect of the matching-extracted inference rule to extract a change state, such as an increase or decrease, of a real object of numeric data described there. For example, as shown in FIGS. 42A and 42B, the analyzing section 85 detects a change state described as [up] or [down] in the inference rule. The inference analyzing section 85 analyzes whether the change state thus detected is established for the attribute value stored in the storage section 73 (step S9).

Suppose, for example, that item names, attribute values, and a title as shown in FIG. 45 are stored in the storage section 73, and [company B], [enterprise], [sales], and [1973] are obtained as a presentation item, a presentation category, a numeric attribute name, and an index item, respectively. In this case, the inference analyzing section 85 finds an inference rule:

cause; [sale of product is down]
effect; [sale of enterprise selling the product is down]

in accordance with the matching between [enterprise] and [sale] in a portion of the effect. In order to check the change state [down] in the effect of this inference rule, the inference analyzing section 85 extracts the row and column components of the two-dimensional arrangement (numeric items) corresponding to the index item [1973].

Note that if the index item is not stored as an item name in the two-dimensional arrangement (numeric items) as shown in FIG. 44, the analyzing section 85 determines that a time series change having an attribute value such as [up] or [down] is not to be presented, and that this inference rule is not established. In this case, a rule indicating a state such as [large] or [small] of [sale] between [products] is established.

If an item corresponding to the index item [1973] is found in the two-dimensional arrangement (numeric items) shown in FIG. 45, the inference analyzing section 85 checks the row and column components of the item in that two-dimensional arrangement (numeric items). As a result, the inference analyzing section 85 detects that the row component is [1] and the column component is [4] from the two-dimensional arrangement (numeric items). Therefore, the inference analyzing section 85 checks whether an item name indicating time such as [1973, year] is arranged in the ascending order in the row represented by the row component [1] while including a word representing time, i.e., the same [year] as in the index item at the end. If the item name representing time is not arranged in the ascending order, the inference analyzing section 85 determines that this inference rule is not established.

If the item name indicating time is arranged in the ascending order, the inference analyzing section 85 detects a character string representing the presentation item [company B] from elements having a row component of [2] or more and a column component of [1] in the two-dimensional arrangement (numeric items) by performing character string matching processing. In addition, the inference analyzing section 85 detects a character string representing [sale] of a real object of the numeric data by performing character string matching processing using the numeric attribute name dictionary 77c and extracts the row component of the detected character string. As a result, the item [company B] is detected from the example shown in FIG. 45, and its row component [3] is extracted.

Thereafter, the inference analyzing section 85 extracts an attribute value indicated by the column component [4] of the item [1973, year] and the row component [3] of the item [company B] from the two-dimensional arrangement to obtain, e.g., a value [120]. Similarly, the inference analyzing section 85 extracts an attribute value of the column component [3] obtained by subtracting [1] from the row component [4] of the item [1973, year] to obtain a value [170]. A subtraction [120–170] of the two values thus extracted is performed. If the difference is negative, the inference analyzing section 85 determines that the change state of numeric data, i.e., the effect of [down] in the inference rule extracted from the inference rule dictionary 79 is satisfied, and that the effect of the inference rule is established. In the case of FIG. 45, since

[120–170]=[–50], that is, the effect indicating the change state of [down] is satisfied by the negative value, it is confirmed that the effect of the inference rule is established.

The inference analyzing section 85 extracts a practical object name indicating a possessive case of a proper noun and numeric data of a category appearing in a portion of the cause of the inference rule in which the effect is established. (step S11). The inference analyzing section 85 checks in accordance with the object name whether the cause of the inference rule is established. In this case, cause; [sale of product is down]
effect; [sale of enterprise selling the product is down]

is given as an inference rule. Therefore, since the category is given as [product] in the cause and as [enterprise] in the effect, the inference analyzing section 85 inquires a user whether sale of any product of [company B] is down, and obtains reply data from the user. If, on the other hand, the cause and the effect of the inference rule have the same category, the inference analyzing section 85 checks in the same manner as in the processing for checking the effect of an inference rule whether the presentation item, the real object of the numeric data, and the index item correspond to the item name and the noun in the title stored in the storage section 73, thereby checking whether the cause is established (step S13).

If the storage section 73 does not store any of the presentation item, the numeric attribute name, the index item, and the attribute name required for the checking processing, the inference analyzing section 85 inquires a user whether a fact which coincides with the cause of the inference rule is present, and obtains a reply from the user.

If the user inputs reply data indicating that a product [red runner] of [company B] corresponds to the cause, the inference analyzing section 85 determines that the cause of the inference rule is established. Upon obtaining this checking result, the inference analyzing section 85 stores the object name [red runner] of [product], which is the possessive case of numeric data of the cause of the rule, as a keyword representing the background of presentation, [sale] as the numeric attribute name, [down] as the change state of the numeric data, and the index item [1973, year] in the keyword storage section 87 (step S15).

After the above processing, the inference analyzing section 85 checks for the next established inference rule to determine whether an inference rule in which the cause and the effect coincides with each other is present in the inference rule dictionary 79 (step S17). In this case, [rule 3]

cause; [price of object influencing on running cost of product is up]
effect; [sale of the product is down]

in the contents of the inference rule dictionary 79 shown in FIGS. 42A and 42B corresponds to that inference rule.

In this case, however, although both the categories of the cause and the effect of this inference rule are [product], the category of the object influencing on the running cost or its item name in the cause cannot be determined. Therefore, the inference analyzing section 85 retrieves the proper noun dictionary 77a to check the category of the object name [red runner] of the product. In this case, a category of [automobile] is obtained. This category [automobile] is a concept included in [product], and a concept including [automobile], i.e., [product] as its parent category is described in correspondence with the category [automobile] in the concept dictionary 77b. As a result, it is found that an inference rule effective for the category [product] can also be applied to the category [automobile].

In the concept dictionary 77b shown in FIGS. 40A through 40C, [oil] is described as the value of the attribute name [object influencing on running cost] of the category [automobile]. Consequently, it is found that the category of [oil] is [energy].

Since, however, the category [energy] as the item name is not stored in the storage section 73, the inference analyzing section 85 inquires a user whether [price] of [oil] is [up] in [1973]. The inference analyzing section 85 checks in accordance with the replay input whether the inference rule is established. If the user inputs data indicating establishment, the inference analyzing section 85 stores the item name [oil], the numeric attribute name [price], and [up] as the change state of the numeric data, together with the index item [1973], in the keyword storage section 87, as the keyword representing the background of presentation.

The above inference is repeatedly executed (steps S11, S13, S15, S17, S19, S21, and S25). When no inference rule is established any longer, the processing of extracting a keyword representing the background of presentation based on the inference of the inference analyzing section 85 is finished.

The image selecting section 89 is then activated. The image selecting section 89 uses a keyword stored in the keyword storage section 87 and representing the state of presentation to retrieve image data added with that keyword from the image data base 97. The image selecting section 89 displays the image data retrieved and extracted from the image data base 97 on the display section 91 for proper image selection performed by a user (step S29). If no proper image is displayed, the image selecting section 89 inquires a user whether he or she inputs an image. If the user replies that there is no image input, the processing is finished.

When the background image is selected, the converting section 95 generates a graph in accordance with user-designated data, such as the type of graph (bar or line graph), the maximum/minimum values, and a scale interval, and on the basis of the item names and the attribute values stored in the storage section 73 (step S31). The display control section 93 performs screen control for the graph generated by the converting section 95 and the image selected by the image selecting section 89. That is, the display control section 93 controls the sizes and positions of the graph and the image and combines them such that the graph is used as a foreground while the selected image is used as a background. The display control section 93 displays the image thus synthesized on the display section 91 (steps S33 and S35).

Assume, for example, that a set of items [red runner], [sale], [down], and [1973] and a set of items [oil], [price], [up], and [1973] are stored as keywords representing the background of presentation in the keyword storage section 87 with respect to the input data as shown in FIG. 45. As a result, an image indicating a state in which not so many people come to trial ride of [red runner] is extracted. Upon selection of this image, a presentation material as shown in FIG. 47 is displayed on the display section 91.

When an image is extracted in accordance with the latter keyword, an image indicating an OPEC meeting of [1973] in which [price] of [oil] is [up], for example, is obtained. By selectively designating this image as a background image, a presentation material as shown in FIG. 44 is displayed on the display section 91.

That is, in the case of FIG. 45, the image of [red runner] which is the cause of poor sales of [company B] can be output as the background of presentation. In the case of FIG. 44, it is possible to output the image which implies that [company B] is largely influenced particularly by the oil shock as the background of presentation.

As described above, according to the system of the present invention which synthesizes and outputs an image corresponding to the contents of presentation as the background of a presentation material such as a graph, an image suited to the intention of presentation can be easily and effectively obtained by using a keyword extracted from the contents of data of an object to be presented. This image can be effectively presented as a highly appealing presentation material to audience.

Note that in this embodiment, each of the character string analyzing section 75 and the analyzing section 81 in FIG. 38 is constituted by software. Detailed flow charts for these sections are shown in FIGS. 48A, 48B, 49A, and 49B. In addition, the converting section 95 is described in detail in pending application U.S. patent application Ser. No. 07/763,501 assigned to the same assignee.

The present invention is not limited to the above embodiment. For example, data to be used as the background of presentation may be sound data, or both a sound and an image can be used. In addition, presentation background data of this type need only be collected in advance by using another means, and a variety of methods can be adopted to select background data to be used. Furthermore, the inference processing for keyword extraction can employ various types of algorithms. That is, the present invention can be variously modified and practiced without departing from the spirit and scope of the invention.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A presentation support system comprising:

input means for inputting content data about an object to be presented and data indicating an intention of presentation, the object to be presented is a structure constituted by coupling a plurality of components;

means for sorting the components into components having the same movements, and generating the structure on the basis of data indicating an coupling order and data indicating a coupling form in units of sorts:

analyzing means for analyzing the presentation intention to infer a casual relationship between events indicated by the content data of the object to be presented, thereby analyzing an object environment of presentation;

presentation data storing means for storing an object for supplementarily explaining the object environment of presentation by using the object environment of presentation as an index;

presentation data selecting means for selectively obtaining an object having he object environment of presentation analyzed by said analyzing means as an index from said presentation data storing means; and display means for displaying, when the content data about the object to be presented is to be displayed in the form of a graph, the object material selected by said presentation data selecting means in combination with the graph.

2. A system according to claim 1, further comprising means for providing the object for supplementarily explaining the object environment background state of presentation as an image or a sound.

3. A system according to claim 1, wherein the content data about the object to be presented includes item names, attribute values of respective items, and a title of the presentation material, and the data indicating the presentation intention includes data for designating an item name, an attribute value, and a noun in the title of the presentation material to be noted.

4. A system according to claim 1, wherein said analyzing means has a proper noun dictionary for describing categories to which proper nouns belong and a concept dictionary for describing properties and attributes of the categories; a numeric attribute name dictionary for describing words representing numeric attributes in correspondence with the numeric attribute names of said concept dictionary; and an inference rule dictionary.

5. A system according to claim 1, further comprising:

condition describing means for describing characteristic conditions concerning constituting components of the object to be presented constituted by predetermined components;

component condition describing means for describing a correspondence between each constituting component and a characteristic condition of each constituting component described in said condition describing means;

selecting means for selecting a characteristic condition corresponding to a predetermined condition from the description in said condition describing means, and selecting a constituting component suited to the predetermined condition in accordance with the selected characteristic condition and the constituting component correspondence described in said component condition describing means; and storage means for storing the constituting component selected by said component selecting means as object data indicating mutual relationships between components.

6. A system according to claim 1, wherein the object to be presented is a structure constituted by coupling a plurality of components, and further comprising means for sorting the components into components having same movements, and generating the structure on the basis of data indicating a coupling order and data indicating a coupling form in units of sorts.

7. A system according to claim 1, wherein the object to be presented is a structure constituted by coupling a plurality of components, and further comprising means for sorting the components into components having same movements, and generating the structure on the basis of data indicating a coupling order and data indicating a coupling form in units of sorts, and data indicating a movement corresponding to each component; and means for causing the structure to perform a predetermined action.

8. A system according to claim 1, further comprising:

polygon sorting means for approximating an object to be displayed by a polyhedron, and sorting polygons constituting the polyhedron into light-source polygons and non-light-source polygons;

optical energy distributing means for calculating a distribution of optical energies in units of wavelengths from each light-source polygon to the non-light-source polygons, and calculating a sum of the optical energies in units of wavelengths from the individual light-source polygons for each non-light-source polygon; and display color determining means for determining a display color of each non-light-source polygon from the sum of optical energies in units of wavelengths.

9. A system according to claim 8, wherein said optical energy distribution means has distribution calculating means for performing weighting in accordance with a radiation angle of light from each light-source polygon in order to reflect illumination characteristics of a light source.

10. A system according to claim 9, further comprising means for checking whether each non-light-source polygon is displayed upon a projection calculation from a view point, and means for checking whether each non-light-source polygon which is determined not to be displayed has an influence on optical energy distribution calculations of polygons to be displayed, wherein the optical energy distribution calculation from each light-source polygon is performed only for non-light-source polygons to be displayed and non-light-source polygons which may have an influence on distribution calculations of the non-light-source polygons to be displayed.

11. A structure generating apparatus comprising:

condition describing means for describing characteristic conditions of constituting components of an object constituted by predetermined components;

component condition describing means for describing a correspondence between each constituting component and a characteristic condition of each constituting component described in said condition describing means;

selecting means for selecting a constituting component and a characteristic condition corresponding thereto from the description in said condition describing means, suited to a predetermined condition in accordance with the selected characteristic condition and the constituting component correspondence described in said component condition describing means; and storage means for storing the constituting component selected by said component selecting means as object data indicating mutual relationships between components.

12. A method of presenting presentation support data, comprising the steps of:

a) inputting content data about an object to be presented and data indicating an intention of presentation;

b) analyzing the presentation intention to infer a causal relationship between events indicated by the content data of the object to be presented, thereby analyzing the object environment of the presentation;

c) storing an object for supplementarily explaining the object environment of presentation by using the object environment to be supplementarily explained as an index;

d) selectively obtaining an object having the object environment of presentation as an index; and e) displaying, when the content data about the object to be presented is to be displayed in the form of a graph, the object in combination with the graph.

13. A method according to claim 12, further comprising the step of:

providing the object for supplementarily explaining the object environment of presentation as an image or a sound.

14. A figure processing apparatus, comprising:

polygon sorting means for approximating an object to be displayed by a polyhedron, and sorting polygons constituting the polyhedron into light-source polygons and non-light-source polygons;

optical energy distributing means for calculating a distribution and sum of optical energies in units of wavelengths from each of the light-source polygons to the non-light-source polygons; and display color determining means for determining a display color of each non-light-source polygon from the sum of optical energies in units of wavelengths.

15. A method for generating a structure constituted by coupling a plurality of comments, the method comprising the steps of:

a) sorting the components into components having same movements;

b) storing data indicating a coupling order and data indicating a coupling for in units of sorts; and c) generating the structure on the basis of the stored data indicating a coupling order and the stored data indicating a coupling form in units of sorts.

16. A method for generating a structure constituted by coupling a plurality of components, the method comprising the steps of:

a) sorting the components into components having the same movements, b) storing data indicating a coupling order, data indicating a coupling form in units of sorts, and data indicating a movement corresponding to each component;

c) generating the structure on the basis of the stored data indicating a coupling order and the stored data indicating a coupling form in units of sorts, and the stored data indicating a movement corresponding to each component; and d) causing the structure to perform a predetermined action.

17. A structure generating method comprising the steps of:

a) describing characteristic conditions of constituting components of an object constituted by predetermined components;

b) describing a correspondence between each constituting component and the characteristic condition of each constituting component as characteristic described in step a);

c) selecting the characteristic condition corresponding to a predetermined condition from the description in step a);

d) selecting a constituting component suited to the predetermined condition in accordance with the selected characteristic condition and the constituting component correspondence described in step b); and e) storing the constituting component selected in step d) as object data indicating relationships between components.

18. A figure processing method comprising the steps of:

a) approximating an object to be displayed by a polyhedron;

b) sorting polyhedrons constituting the polyhedron into light-source polygons and non-light-source polygons;

c) calculating a distribution and sum of optical energies in units of wavelengths from each light-source polygon to the non-light-source polygons;

d) determining a display color of each non-light-source polygon from the sum of optical energies in units of wavelengths; and e) displaying the polygons on a display unit.

19. The method according to claim 18, wherein the step c) includes a step for weighting in accordance with a radiation angle of light from each light-source polygon in order to reflect illumination characteristics of a light source.

20. The method according to claim 18, further comprising the steps of;

g) checking whether each non-light-source polygon is displayed upon a projection calculation from a view point;

h) checking whether each non-light-source polygon which is determined not to be displayed has an influence on optical energy distribution calculations of polygons to be displayed, and wherein the optical energy distribution calculation from each light-source polygon is performed only for non-light-source polygons to be displayed and non-light-source polygons which may have an influence on distribution calculations to of the non-light-source polygons to be displayed.

21. A structure generating apparatus, comprising:

input means for inputting data required to generate a desired graphic structure;

component description means for describing characteristic conditions which are required to produce component and do not depend on the characteristic features of the component;

component condition description means for describing a correspondence of each constituting component with characteristic conditions;

link selecting means for describing link selecting conditions for each constituting component;

link condition descriptor means for describing link conditions for each constituting component;

local selecting means for describing selecting conditions for local conditions for of each constituting component;

local condition descriptor means for describing local conditions for each constituting component;

component selecting means for describing selecting conditions of each constituting component;

structure storage means for storing each component obtained by the respective selecting operations in the link selecting means, the local selecting means, and the component selecting means as object data to be stored within a network structure or a hierarchical structure;

display means for displaying object data based on the network or hierarchical structure stored in the structure storage means; and structure management means for managing exchange of various data between the component descriptor means, the component conditions descriptor means, the link selecting means, the link condition descriptor means, the local selecting means, a local condition descriptor means, the component selecting means, the structure storage means, and the displaying means.

22. A structure generating method, comprising the steps of:

a) inputting data required to generate a desired graphic structure;

b) describing characteristic conditions which are required to produce component and do not depend on the characteristic features of the component;

c) describing a correspondence between of each constituting with characteristic conditions;

d) describing link selecting conditions for each constituting component;

e) describing link conditions for each constituting component;

f) describing selecting conditions for local conditions for each constituting component;

g) describing local conditions for each constituting component;

h) describing selecting conditions for each constituting component;

i) storing each component obtained by the respective selecting operations in step d), the step f), and the step h) as object data within a network structure or a hierarchical structure;

j) displaying object data based on the network or hierarchical structure stored in the step i); and k) managing exchange of various data between the steps b) through j).

* * * * *